US012720396B2

(12) United States Patent
Choi et al.

(10) Patent No.: US 12,720,396 B2
(45) Date of Patent: Aug. 25, 2026

(54) ELECTRONIC DEVICE AND METHOD FOR IMPROVING COMMUNICATION QUALITY

(71) Applicant: SAMSUNG ELECTRONICS CO., LTD., Suwon-si (KR)

(72) Inventors: Seongsu Choi, Suwon-si (KR); Junsu Choi, Suwon-si (KR); Hyeonu Choi, Suwon-si (KR); Hyunkee Min, Suwon-si (KR); Hongchan Park, Suwon-si (KR); Jaeho Yoon, Suwon-si (KR); Sunkee Lee, Suwon-si (KR); Junhak Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 18/505,051

(22) Filed: Nov. 8, 2023

(65) Prior Publication Data

US 2024/0098602 A1 Mar. 21, 2024

Related U.S. Application Data

(63) Continuation of application No. PCT/KR2023/013795, filed on Sep. 14, 2023.

(30) Foreign Application Priority Data

Sep. 21, 2022 (KR) ........................ 10-2022-0119340
Nov. 29, 2022 (KR) ........................ 10-2022-0162931

(51) Int. Cl.
*H04W 36/30* (2009.01)
*H04M 1/02* (2006.01)
(Continued)

(52) U.S. Cl.
CPC ....... *H04W 36/304* (2023.05); *H04M 1/0216* (2013.01); *H04M 1/0243* (2013.01);
(Continued)

(58) Field of Classification Search
CPC ........... H04W 36/304; H04W 36/0072; H04W 36/00837; H04W 48/16; H04W 84/12;
(Continued)

(56) References Cited

U.S. PATENT DOCUMENTS 11,056,768 B2 7/2021 Kim et al.
11,315,445 B2 4/2022 Li et al.
(Continued)

FOREIGN PATENT DOCUMENTS

CN 111212453 A 5/2020
EP 2892282 A1 * 7/2015 ........ H04W 52/0206
(Continued)

OTHER PUBLICATIONS

IEEE Std 802.11-2020. “Part 11: Wireless LAN MAC and PHY Specifications”, IEEE Standard for Information Technology—Local and Metropolitan Area Networks—Specific Requirements Dec. 3, 2020.

(Continued)

*Primary Examiner* — Marisol Figueroa
(74) *Attorney, Agent, or Firm* — Jefferson IP Law, LLP

(57) ABSTRACT

Electronic devices and methods according to various embodiments of the disclosure may comprise or utilize a display of which at least a portion is flexible and a display area exposed to the outside, which is changeable, an antenna module, a communication module for performing wireless local area network (LAN) communication with an access point by using the antenna module, and a processor. Various other embodiments are possible.

20 Claims, 18 Drawing Sheets

(51) Int. Cl.
*H04W 36/00* (2009.01)
*H04W 48/16* (2009.01)
*H04W 84/12* (2009.01)

(52) U.S. Cl.
CPC . *H04W 36/0072* (2013.01); *H04W 36/00837* (2018.08); *H04W 48/16* (2013.01); *H04W 84/12* (2013.01)

(58) Field of Classification Search
CPC ..... H04W 36/30; H04W 76/15; H04W 24/02; H04W 36/08; H04W 74/06; H04W 88/06; H04M 1/0216; H04M 1/0243; H04M 1/02; H04M 1/0235; H04M 2250/06; H04M 1/0214; H04M 1/0245
See application file for complete search history.

(56) References Cited

U.S. PATENT DOCUMENTS

| | | | | |
|---|---|---|---|---|
| 11,418,637 | B2 | 8/2022 | Choi et al. | |
| 2008/0198811 | A1* | 8/2008 | Deshpande | H04W 48/16 370/332 |
| 2013/0223423 | A1 | 8/2013 | Lee et al. | |
| 2020/0265758 | A1* | 8/2020 | Huang | G09F 9/301 |
| 2020/0314734 | A1 | 10/2020 | Tang | |
| 2020/0337159 | A1 | 10/2020 | Yang et al. | |
| 2021/0045012 | A1 | 2/2021 | Lee et al. | |
| 2022/0116077 | A1 | 4/2022 | Kim et al. | |
| 2022/0232459 | A1 | 7/2022 | Lee | |
| 2022/0407955 | A1 | 12/2022 | Kim et al. | |
| 2023/0076323 | A1 | 3/2023 | Son et al. | |
| 2023/0393625 | A1 | 12/2023 | Kim et al. | |

FOREIGN PATENT DOCUMENTS

| | | | |
|---|---|---|---|
| KR | 10-2013-0099532 | A | 9/2013 |
| KR | 10-1560244 | B1 | 10/2015 |
| KR | 10-2017-0066944 | A | 6/2017 |
| KR | 10-2020-0001344 | A | 1/2020 |
| KR | 10-2229913 | B1 | 3/2021 |
| KR | 10-2021-0142396 | A | 11/2021 |
| KR | 10-2022-0001647 | A | 1/2022 |
| KR | 10-2022-0079334 | A | 6/2022 |
| KR | 10-2022-0082014 | A | 6/2022 |
| KR | 10-2022-0104421 | A | 7/2022 |
| KR | 10-2024-0012999 | A | 1/2024 |
| KR | 10-2024-0027500 | A | 3/2024 |

OTHER PUBLICATIONS

International Search Report & Written Opinion for PCT/KR2023/013795 dated Dec. 11, 2023.
Extended European Search Report dated Oct. 8, 2025, issued in European Application No. 23868492.2-1206.

* cited by examiner

FIG. 1

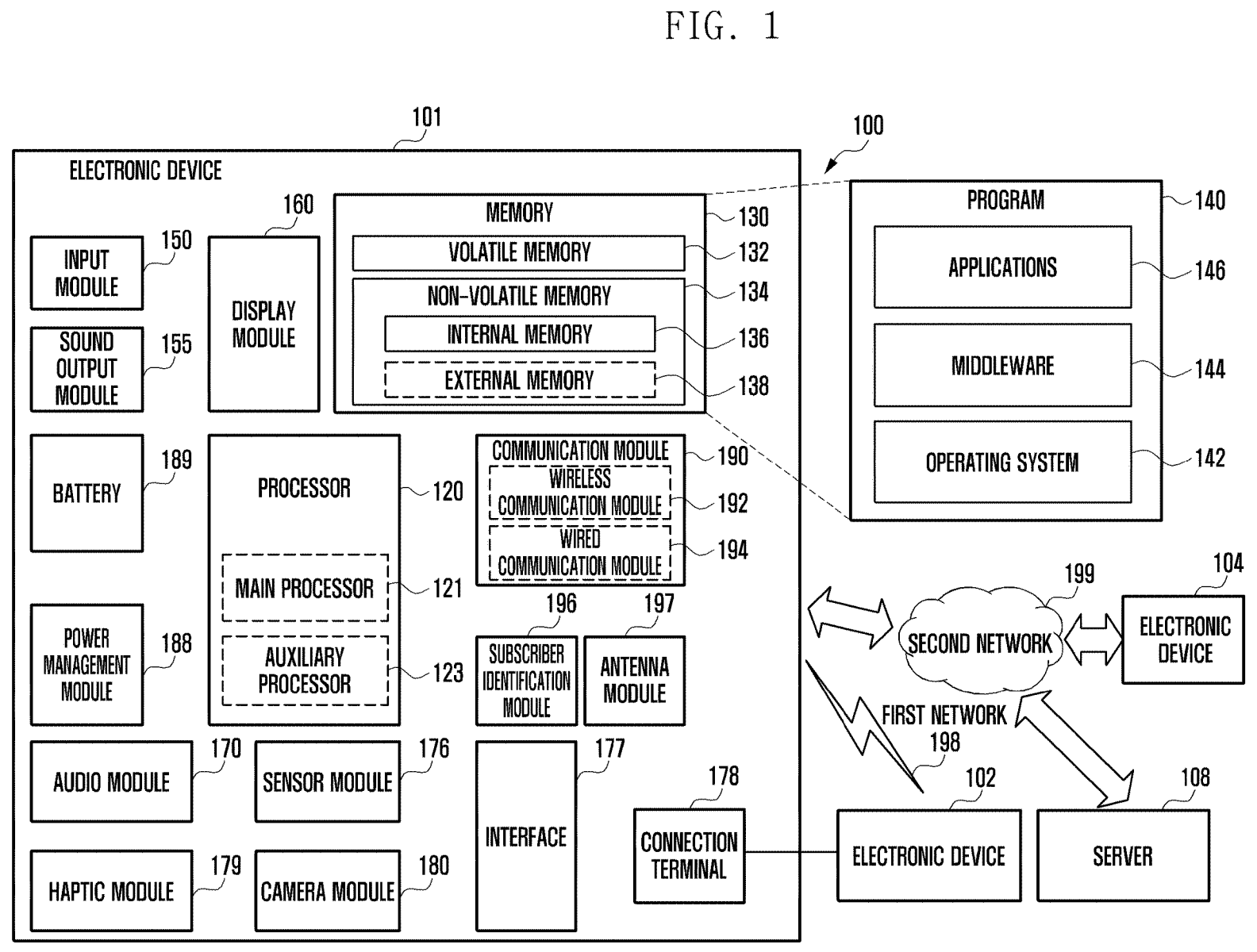

100
101
ELECTRONIC DEVICE
INPUT MODULE 150
SOUND OUTPUT MODULE 155
BATTERY 189
POWER MANAGEMENT MODULE 188
AUDIO MODULE 170
HAPTIC MODULE 179
DISPLAY MODULE 160
PROCESSOR 120
MAIN PROCESSOR 121
AUXILIARY PROCESSOR 123
SENSOR MODULE 176
CAMERA MODULE 180
MEMORY 130
VOLATILE MEMORY 132
NON-VOLATILE MEMORY 134
INTERNAL MEMORY 136
EXTERNAL MEMORY 138
COMMUNICATION MODULE 190
WIRELESS COMMUNICATION MODULE 192
WIRED COMMUNICATION MODULE 194
SUBSCRIBER IDENTIFICATION MODULE 196
ANTENNA MODULE 197
INTERFACE 177
CONNECTION TERMINAL 178
PROGRAM 140
APPLICATIONS 146
MIDDLEWARE 144
OPERATING SYSTEM 142
SECOND NETWORK 199
FIRST NETWORK 198
ELECTRONIC DEVICE 104
SERVER 108
ELECTRONIC DEVICE 102

FIG. 14

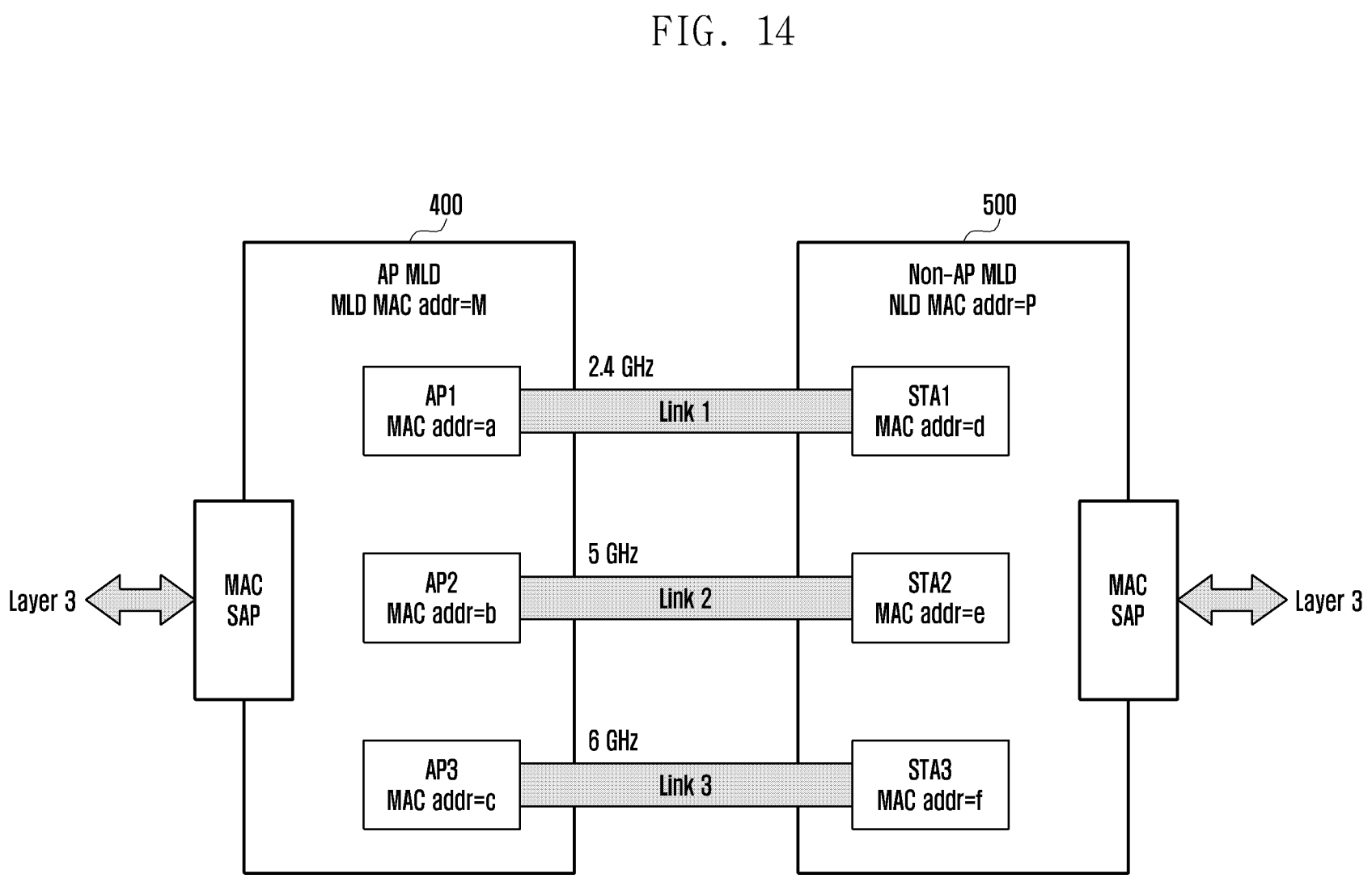

400
AP MLD
MLD MAC addr=M
AP1
MAC addr=a
AP2
MAC addr=b
AP3
MAC addr=c
MAC
SAP
Layer 3

2.4 GHz
Link 1
5 GHz
Link 2
6 GHz
Link 3

500
Non-AP MLD
NLD MAC addr=P
STA1
MAC addr=d
STA2
MAC addr=e
STA3
MAC addr=f
MAC
SAP
Layer 3

ELECTRONIC DEVICE AND METHOD FOR IMPROVING COMMUNICATION QUALITY

CROSS REFERENCE TO RELATED APPLICATIONS

This application is a continuation application of International Application No. PCT/KR2023/013795, filed on Sep. 14, 2023, which claims priority from and derives the benefit of Korean Patent Application No. 10-2022-0162931 filed on Nov. 29, 2022, and Korean Patent Application 10-2022-0119340 filed on Sep. 21, 2022, the entire contents of each of these applications is hereby incorporated in their entirety, by reference.

TECHNICAL FIELD

The disclosure relates to electronic devices and to methods for improving a communication quality in electronic devices for supporting wireless LAN communications.

BACKGROUND

Mobile electronic devices (hereinafter, electronic devices), such as tablets, personal computers (PCs), and smartphones, may provide a user experience through various applications. To this end, an electronic device may include a display for providing various applications and multimedia contents. Recently, electronic devices have been developed to have a display of various form factors to provide improved user experience and satisfy space efficiency. For example, an electronic device may include a foldable display having a folded form and a rollable display having a form in which a wound display is extended to the outside.

An electronic device may support various wireless communication methods and require higher speed wireless communication technology to improve user experience. For example, the electronic device may support wireless local area network (LAN) communication for high-speed wireless connection. The wireless LAN communication may be commonly referred to as Wi-Fi and communication standards are specified in the Institute of Electrical and Electronics Engineers (IEEE) 802.11 standard. An electronic device may be connected to an adjacent access point through wireless LAN communication and transmit or receive data to or from an external network through the access point.

DISCLOSURE

Electronic devices may include an antenna module including one or more antenna elements for supporting various wireless communication technologies including wireless LAN communication. The antenna module may be mounted inside a housing of the electronic device, and the housing, the antenna module, and other structures of the electronic device may be designed to effectively transmit or receive a signal. In the case that the electronic device includes a display having an extendable/contractible form, such as a foldable display or rollable display, transmission/reception performance of the antenna module may be changed depending on a state of the display. For example, in the case that a user extends or contracts the display, at least a portion of an antenna element may be changed in position or obstructed by obstacles so as to cause a change, such as weakening of strength of signals transmitted and received by the antenna module.

An electronic device according to various embodiments of the present disclosure may include a display of which at least a portion is flexible and a display area exposed to the outside may be changed, an antenna module, a communication module for performing wireless LAN communication with an access point by using the antenna module, and a processor.

According to various embodiments, the processor may be configured to detect a change of the display area of the display and, in the case that the change of the display area of the display is detected, scan at least one adjacent access point by using the communication module and the antenna module.

According to various embodiments of the disclosure, establishment of a communication link for wireless LAN communication with an optimum access point when a state of the display is changed may provide an electronic device for allowing data communication in a better environment and a method for improving a communication quality of the electronic device.

BRIEF DESCRIPTION OF DRAWINGS

FIG. 1 shows a block diagram illustrating an electronic device in a network environment according to various embodiments of the present disclosure.

FIG. 14 illustrates an MLO link of an electronic device according to various embodiments of the present disclosure.

Figure 2A:
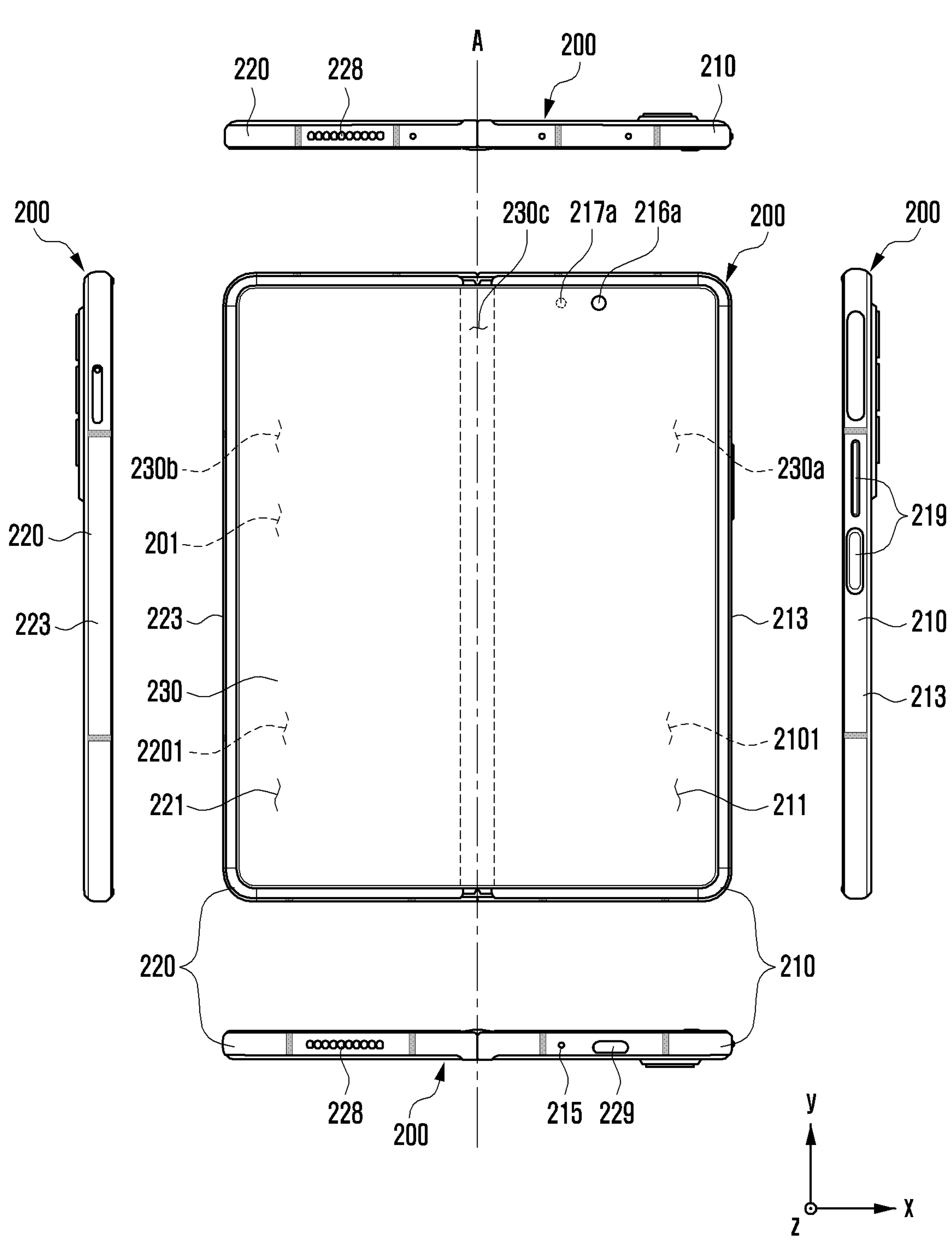
FIG. 2A and FIG. 2B illustrate a structure of a foldable type electronic device according to various embodiments of the present disclosure.

Hereinafter, various embodiments will be described in detail with reference to the accompanying drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2B:
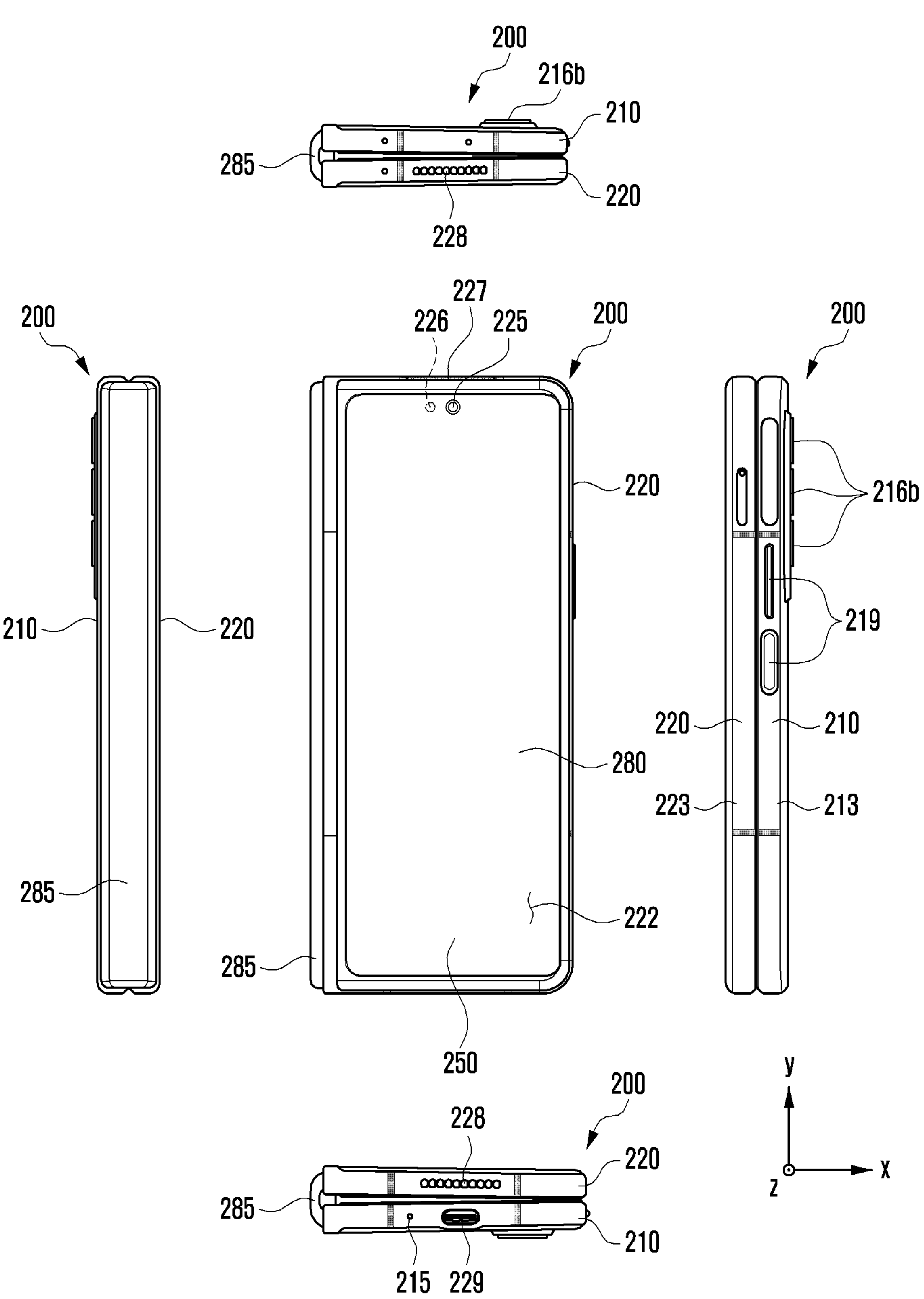

FIG. 2A and FIG. 2B illustrate a structure of a foldable type electronic device according to various embodiments.

FIG. 2A illustrates a front surface of the electronic device in an unfolded state and FIG. 2B illustrates the front surface of the electronic device in a folded state.

Referring to FIG. 2A and FIG. 2B, the electronic device 200 may include a pair of housings 210 and 220 (e.g., a foldable housing structure) rotatably coupled to each other around a folding axis A through a hinge module 285 to be foldable with respect to each other, a first display 230 (or a main display) disposed through the pair of housings 210 and 220, and/or a second display 280 (or a sub-display) disposed through a second housing 220. At least a portion of the first display 230 may be formed to be flexible and the first display may correspond to a foldable display foldable around the folding axis A.

According to various embodiments, at least a portion of the hinge module 285 may be disposed not to be visible from the outside through the first housing 210 and the second housing 220 and disposed not to be visible through a hinge housing for covering a foldable portion in the unfolded state. In the present disclosure, the surface having the first display 230 disposed thereon may be defined as a front surface of the electronic device 200 and an opposite surface of the front surface may be defined as a rear surface of the electronic device 200. A surface surrounds a space between the front surface and the rear surface may be defined as a lateral surface of the electronic device 200.

According to various embodiments, the pair of housings 210 and 220 may include the first housing 210 and the second housing 220 arranged to be foldable with respect to each other through the hinge module 285. According to various embodiments, the pair of housings 210, 220 are not limited to the shape and combination described in FIG. 2A and FIG. 2B, and may be implemented by another shape or a combination and/or coupling of components. According to various embodiments, the first housing 210 and the second housing 220 may be arranged on opposite sides around the folding axis A and have generally symmetric shapes based on the folding axis A. According to various embodiments, the first housing 210 and the second housing 220 may be folded to be asymmetric based on the folding axis A. According to various embodiments, the first housing 210 and the second housing 220 are arranged on opposite sides around the folding axis A and have generally symmetric shapes based on the folding axis A.

According to various embodiments, the first housing 210 may include a first surface 211 connected to the hinge module 285 in the unfolded state of the electronic device 200 and disposed to face the front surface of the electronic device 200, a second surface (not shown) facing an opposite direction of the first surface 211, and/or a first lateral member 213 surrounding at least a portion of a first space between the first surface 211 and the second surface. According to various embodiments, the second housing 220 may include a third surface 221 connected to the hinge module 285 in the unfolded state of the electronic device 200 and disposed to face the front surface of the electronic device 200, a fourth surface (not shown) facing an opposite direction of the third surface 221, and/or a second lateral member 223 surrounding at least a portion of a second space between the third surface 221 and the fourth surface. According to various embodiments, the first surface 211 may be folded in a direction substantially identical to the third surface 221 in the unfolded state and may be at least partially face the third surface 221 in the folded state.

According to various embodiments, the electronic device 200 may include a recess 201 configured to receive the first display 230 through a structural coupling of the first housing 210 and the second housing 220. According to various embodiments, the recess 201 may have substantially the same size as the first display 230. According to various embodiments, the first housing 210 may include a first protection frame **213*a* coupled to the first lateral member 213 when viewing the first display 230 from above, and disposed to overlap an edge of the first display 230 so as to cover the edge of the first display 230 not to be visible from the outside. According to various embodiments, the first protection frame 213*a* may be integrally formed with the first lateral member 213. According to various embodiments, the second housing 220 may include a second protection frame 223*a* coupled to the second lateral member 223 when viewing the first display 230 from above, and disposed to overlap an edge of the first display 230 so as to cover the edge of the first display 230 not to be visible from the outside. According to various embodiments, the second protection frame 223*a* may be integrally formed with the first lateral member 223. In various embodiments, the first protection frame 213*a* and the second protection frame 223*a*** may be omitted.

According to various embodiments, the hinge housing (or a hinge cover) may be disposed between the first housing 210 and the second housing 220 and disposed to cover a portion of the hinge module 285 disposed in the hinge housing. According to various embodiments, the hinge housing may be covered by a portion of the first housing 210 and the second housing 220 or exposed to the outside depending on the unfolded state, folded state, or intermediate state of the electronic device 200. For example, in the case that the electronic device 200 is in the unfolded state, at least a portion of the hinge housing may be covered by the first housing 210 and the second housing 220 is substantially not exposed. According to various embodiments, in the case that the electronic device 200 is in the folded state, at least a portion of the hinge housing may be exposed to the outside between the first housing 210 and the second housing 220. According to various embodiments, in the intermediate state in which the first housing 210 and the second housing 220 are folded with a certain angle, the hinge housing 285 may be at least partially exposed to the outside of the electronic device 200 between the first housing 210 and the second housing 220. For example, an area exposed to the outside may be smaller than that of a completed folded state. According to various embodiments, the hinge housing may include a curved surface.

According to various embodiments, in the case that the electronic device 200 is in the folded state (e.g., the state in FIG. 2A), the first housing 210 and the second housing 220 may form an angle of approximately 180 degrees therebetween, and a first area 230*a*, a second area 230*b*, and a folding area 230*c* of the first display 230 may be arranged to form the same plane and to face substantially the same direction (e.g., the z-axis direction). According to another embodiment, in the case that the electronic device 200 is in the unfolded state, the first housing 210 may rotate at an angle of about 360 degrees with respect to the second housing 220.

According to various embodiments, in the case that the electronic device 200 is in the folded state (e.g., the state in FIG. 2B), the first surface 211 of the first housing 210 and the third surface 221 of the second housing 220 may be arranged to face each other. Here, the first area 230*a* and the second area 230*b* of the first display 230 may be arranged to face each other while forming a narrow angle (e.g., a range of 0 degrees to about 10 degrees) therebetween through the folding area 230*c*. According to various embodiments, at least a portion of the folding area 231*c* may be changed to be a curved shape having a certain curvature. According to various embodiments, when the electronic device 200 is in the intermediate state, the first housing 210 and the second housing 220 may be arranged at a certain angle. In this case, the first area 230*a* and the second area 230*b* of the first display 230 may form an angle larger than that of the folded state and smaller than that of the unfolded state, and the curvature of the folding area 230*c* may be smaller than that of the folded state and larger than that of the unfolded state. In some embodiments, the first housing 210 and the second housing 220 may form an angle that may stop at a specified folding angle between the folded state and the unfolded state through the hinge module 285. In some embodiments, the first housing 210 and the second housing 220 may be operated while being pressurized in an unfolding direction or a folding direction based on a specified inflection angle through the hinge module 285.

According to various embodiments, the electronic device 200 may include at least one of an audio input device 215 disposed in the first housing 210 and/or the second housing 220, an audio output device 228, a sensor module 217*a* or 226, a camera module 216*a*, 216*b*, or 225, a key input device 219, an indicator (not shown), or a connector port 229. In some embodiments, the electronic device 200 may omit at least one of the components or may additionally include at least one other component.

According to various embodiments, the electronic device 200 may include the first display 230 disposed to receive support from the third surface 221 of the second housing 220 through the hinge module 285 from the first surface 211 of the first housing 210, and the second display 280 disposed in an internal space of the second housing 220 to be at least partially visible from the outside through the fourth surface opposite to the third surface 221. In some embodiments, the second display 280 may be disposed in the internal space of the first housing 210 to be at least partially visible from the outside through the second surface opposite to the first surface 211. According to various embodiments, the first display 230 may be mainly used in the unfolded state of the electronic device 200 and the second display 280 may be mainly used in the folded state of the electronic device 200.

According to various embodiments, in the case that the electronic device 200 is in the intermediate state, the electronic device may control the first display 230 and/or the second display 280 to be usable based on a folding angle of the first housing 210 and the second housing 220.

According to various embodiments, the first display 230 may be disposed in a reception space formed by the pair of housings 210 and 220. For example, the first display 230 may be disposed in the recess 201 formed by the pair of housings 210 and 220, and may be disposed to occupy substantially most of the front surface of the electronic device 200 in the unfolded state. According to various embodiments, the first display 230 may include the first area 230*a* facing the first housing 210 and the second area 230*b* facing the second housing 220. According to various embodiments, the first display 230 may include the folding area 230*c* including a portion of the first area 230*a* and a portion of the second area 230*b* based on the folding axis A. According to various embodiments, at least a portion of the folding area 230*c* may include an area corresponding to the hinge module 285. According to various embodiments, area division of the first display 230 is an exemplary physical division by the pair of housings 210 and 220 and the hinge module 285, and the first display 230 may be displayed as a substantially seamless single full screen through the pair of housings 210 and 220 and the hinge module 285. According to various embodiments, the first area 230*a* and the second area 230*b* may have an overall symmetrical shape or a partially asymmetrical shape based on the folding area 230*c*.

According to various embodiments, the electronic device 200 may include a first rear cover (not shown) disposed on the second surface opposite to the first surface 211 of the first housing 210 and a second rear cover disposed on the fourth surface opposite to the third surface 221 of the second housing 220. In some embodiments, at least a portion of the first rear cover may be integrally formed with the first lateral member 213. In some embodiments, at least a portion of the second rear cover may be integrally formed with the second lateral member 223. According to various embodiments, at least one of the first rear cover and the second rear cover may be formed of a substantially transparent plate (e.g., a polymer plate or a glass plate including various coating layers) or an opaque plate. According to various embodiments, the first rear cover may be formed of an opaque plate such as, for example, coated or tinted glass, ceramic, polymer, metal (e.g., aluminum, stainless steel (STS), or magnesium), or a combination of at least two of the materials. According to various embodiments, the second rear cover may be formed through a substantially transparent plate such as glass or polymer.

According to various embodiments, the electronic device 200 may include at least one antenna module (not shown) capable of transmitting or receiving a wireless communication signal from the outside. Each antenna module may include multiple antenna elements and each antenna element may be electrically connected to each other. According to various embodiments, the antenna module may be disposed in the first housing 210 and the second housing 220. According to another embodiment, a portion of the antenna elements of the antenna module may be disposed in the first housing 210 and the other portion thereof may be disposed in the second housing 220. According to various other embodiments, the antenna elements may be disposed on a rear surface of the first display 230 inside the first housing 210 and/or the second housing 220 and may be disposed, for example, between the first display 230 and the rear cover at an upper end (e.g., an upper end in they direction) of the first display 230.

According to various embodiments, the electronic device 200 may include multiple antenna modules and each antenna module may support wireless communication in different frequency band. According to various embodiments, at least one of the antenna modules may be used for multiple wireless communication technologies (e.g., Wi-Fi and Bluetooth) using the same frequency band (e.g., 2.4 Gz).

According to various embodiments, in the case that the electronic device 200 is changed from the unfolded state to the folded state, at least a portion of the antenna modules may be covered by a structure of the electronic device 200 or a user's hand or may have a change in an electrical structure. Accordingly, strength of a signal transmitted or received through the antenna modules may be weaker in the folded state than the unfolded state.

Figure 3A:
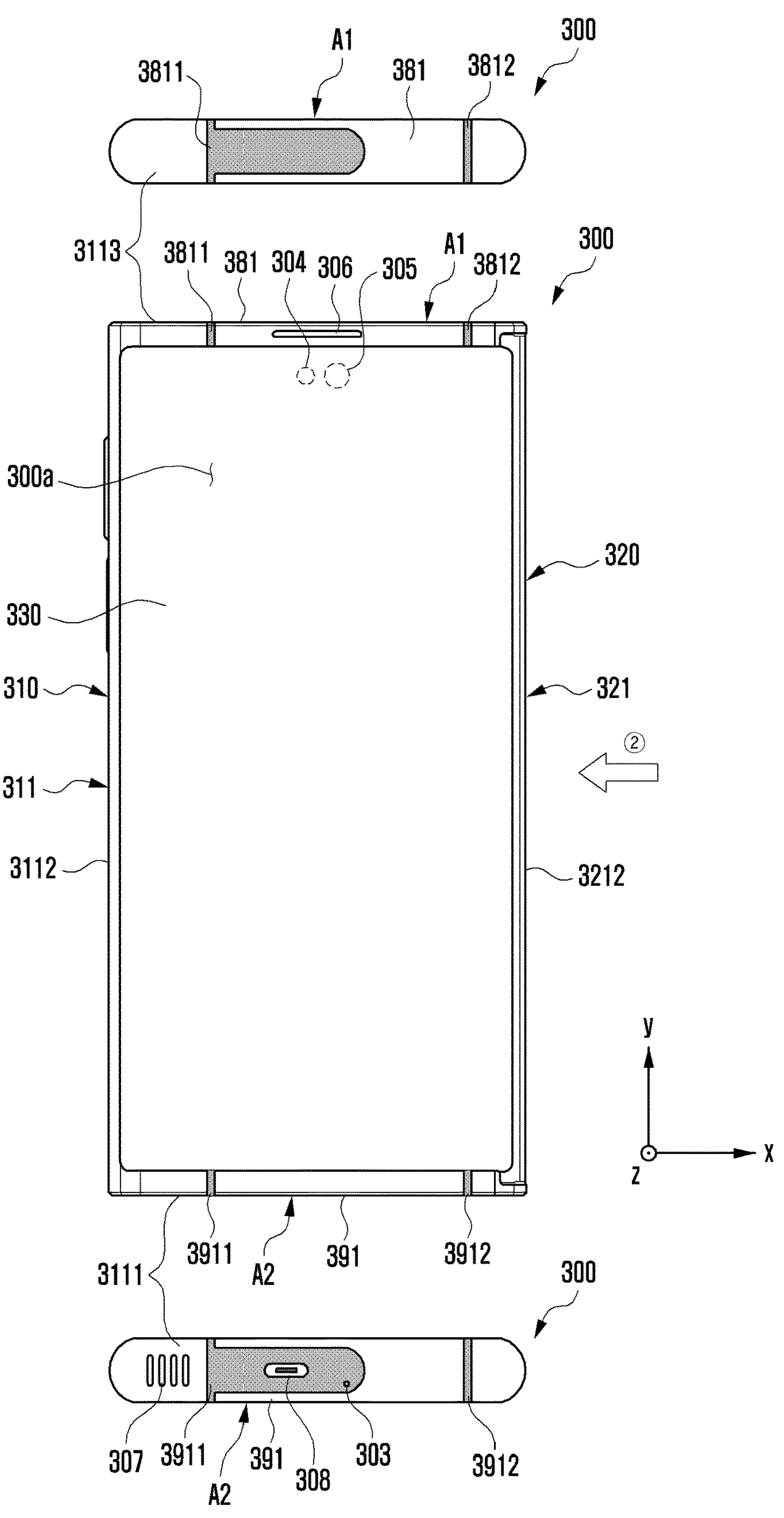
FIG. 3A and FIG. 3B illustrate a structure of a rollable type electronic device according to various embodiments of the present disclosure.
Figure 3B:
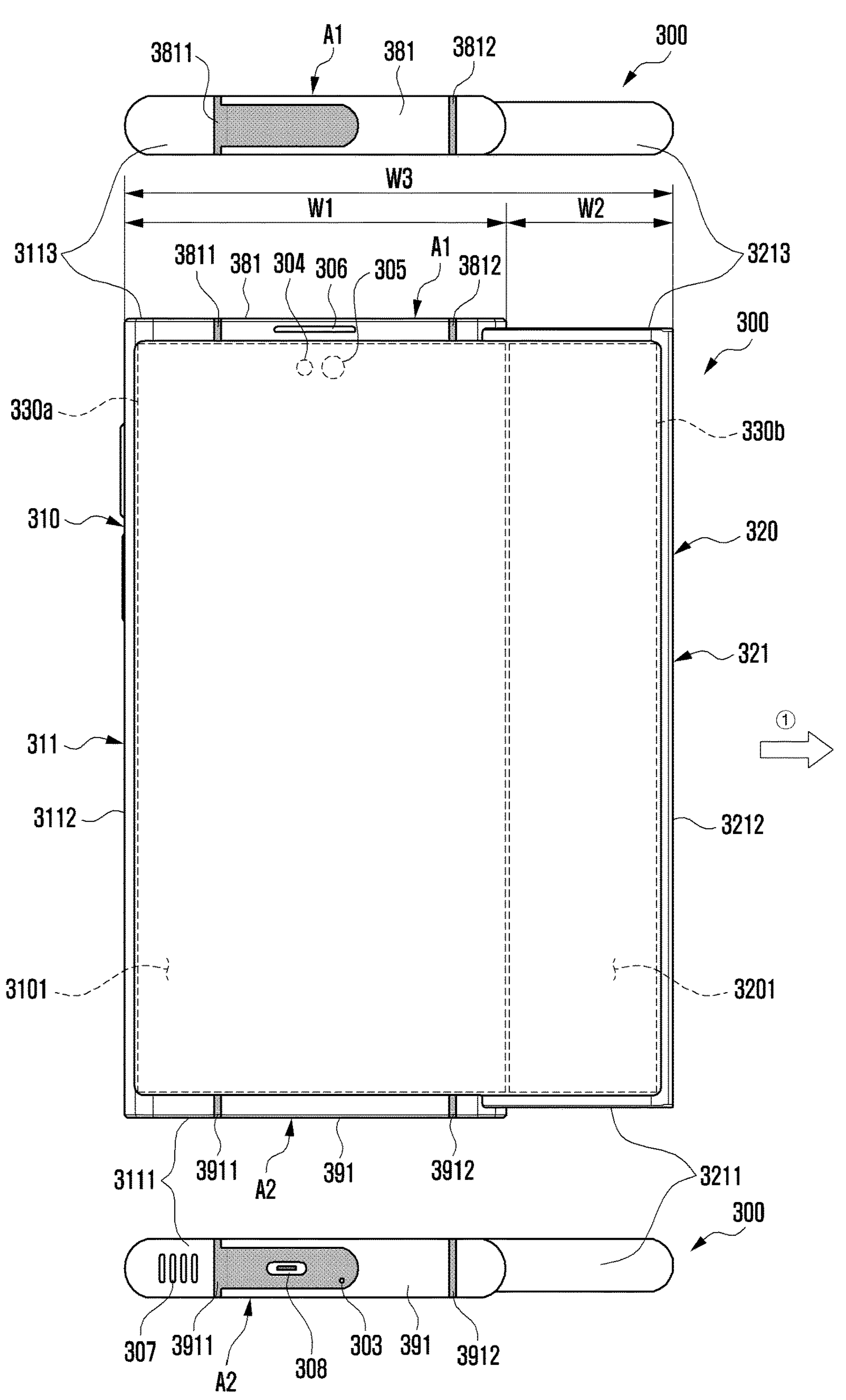

FIG. 3A and FIG. 3B illustrate a structure of a rollable type electronic device according to various embodiments.

FIG. 3A illustrates a front surface of the electronic device in a slide-in state and FIG. 2B illustrates the front surface of the electronic device in a slide-out state.

Referring to FIG. 3A and FIG. 3B, the electronic device 300 may include a first housing 310 (or a base housing), a second housing 320 (or a slide housing) movably coupled within a designated direction (e.g., the x-axis direction) and designated distance from the first housing 310, and a display 330 disposed to be supported by at least a portion of the first housing 310 and the second housing 320. The display 330 may correspond to an extendable or stretchable display of which at least a portion is flexible.

According to various embodiments, at least a portion of the second housing 320 may be received in a first space 3101 of the first housing 310 to be changed into the slide-in state. According to various embodiments, the electronic device 300 may include a bendable member (a bendable member or a bendable support member) which may at least partially form the same plane with at least a portion of the first housing 310 in the slide-out state and may be at least partially received in a second space 3201 of the second housing 320 in the slide-in state. According to various embodiments, at least a portion of the display 330 may be received in an internal space 3201 of the second housing 320 while being supported by the bendable member so as to be disposed to be invisible from the outside. According to various embodiments, at least a portion of the display 330 may be disposed to be visible from the outside while being supported by the bendable member for at least partially forming the same plane with the first housing 310.

According to various embodiments, the electronic device 300 may include a front surface 300*a* (e.g., a first surface), a rear surface (not shown) (e.g., a second surface) facing opposite to the front surface 300*a*, and a lateral surface (not shown) surrounding a space between the front surface 300*a* and the rear surface. According to various embodiments, the electronic device 300 may include the first housing 310 including a first lateral member 311 and the second housing 320 including a second lateral member 321. According to various embodiments, the first lateral member 311 may include a first lateral surface 3111 having a first length along a first direction (e.g., the x-axis direction), a second lateral surface 3112 extending to have a second length longer than the first length along a substantially perpendicular direction (e.g., the y-axis direction) from the first surface 3111, and a third surface 3113 extending from the second lateral surface 3112 substantially parallel with the first lateral surface 3111 and having the first length. According to various embodiments, the first lateral member 311 may be at least partially formed of a conductive material (e.g., a metal). According to various embodiments, at least a portion of the first lateral member 311 may include a first support member 312 extending to at least a portion of the first space 3101 of the first housing 310.

According to various embodiments, the second lateral member 321 may include a fourth lateral surface 3211 at least partially corresponding to the first lateral surface 3111 and having a third length, a fifth lateral surface 3212 extending in a direction substantially parallel with the second lateral surface 3112 from the fourth lateral surface 3211 and having a fourth length longer than the third length, and a sixth lateral surface 3213 extending from the fifth lateral surface 3212 to correspond to the third lateral surface 3113 and having the third length.

According to various embodiments, the second lateral member 321 may be at least partially formed of a conductive material (e.g., a metal). According to various embodiments, at least a portion of the second lateral member 321 may include a second support member 322 extending to at least a portion of the second space 3201 of the second housing 320. According to various embodiments, the first lateral surface 3111 and the fourth lateral surface 3211, and the third lateral surface 3113 and the sixth lateral surface 3213 may be slidably coupled to each other. According to various embodiments, in the slide-in state, the fourth lateral surface 3211 may overlap the first lateral surface 3211 to be disposed such that it is substantially invisible from the outside.

According to various embodiments, in the slide-in state, the sixth lateral surface 3213 may overlap the third lateral surface 3213 to be disposed such that it is substantially invisible from the outside. In some embodiments, at least a portion of the fourth lateral surface 3211 and the sixth lateral surface 3213 may be disposed to be at least partially visible from the outside in the slide-in state. According to various embodiments, in the slide-in state, the second support member 322 may overlap the first support member 312 to be disposed to be substantially invisible from the outside. In some embodiments, in the slide-in state, a portion of the second support member 322 may overlap the first support member 312 to be disposed to be invisible from the outside and a remaining portion of the second support member 322 may be disposed to be visible from the outside.

According to various embodiments, the electronic devices may include a rear cover (not shown) disposed on at least a portion of the first housing 310 at a rear surface thereof. According to various embodiments, the rear cover may be disposed through at least a portion of the first support member 312. In some embodiments, the rear cover may be integrally formed with the first lateral member 311. According to various embodiments, the rear cover may be formed by coated or colored glass, ceramic, or a metal (e.g., aluminum, stainless steel (STS), or magnesium), or a combination of at least two of the materials. In some embodiments, the rear cover may extend to at least a portion of the first lateral member 311. In some embodiments, at least a portion of the first support member 312 may be replaced with the rear cover. In some embodiments, the electronic device 300 may include another rear cover (e.g., a second rear cover) which is disposed on at least a portion of the second support member 322 in the second housing 320 or replaces at least a portion of the second support member 322.

According to various embodiments, the electronic device 300 may include a display 330 disposed to be supported by at least a portion of the first housing 310 and the second housing 320. According to various embodiments, the display 330 may include a first part 330*a* (or a flat part) always visible from the outside and a second part 330*b* (or a bendable part) extending from the first part 330*a* and at least partially received in the second space 3201 of the second housing 320 to allow at least a portion thereof to be invisible from the outside in the slide-in state. According to various embodiments, the first part 330*a* may be disposed to be supported by the first housing 310 and the second part 330*b* may be disposed to be at least partially supported by a bendable member.

According to various embodiments, in a state in which the second housing 320 is slid-out in a designated direction (① direction), the display 330 may be disposed to extend from the first part 330*a*, from substantially the same plane with the first part 330*a*, and visible from the outside while being supported by the bendable member. According to various embodiments, in a state in which the second housing 320 is slid-in along a designated direction (② direction), the second part 330*b* of the display 330 may be received in the second space 3201 of the second housing 320 and disposed such that it is invisible from the outside. Accordingly, the electronic device 300 may induce a display area of the display 330 to be variable according to the second housing 320 moving from the first housing 310 along a designated direction (e.g., the x-axis direction) in a sliding manner.

According to various embodiments, the first housing 310 and the second housing 320 may operate in a sliding manner to allow a whole width thereof to be variable with respect to each other. According to various embodiments, the electronic device 300 may be configured to have a first width W1 from the second lateral surface 3112 to the fifth lateral surface 3212 in the slide-in state. According to various embodiments, in the slide-out state, the electronic device 300 may be configured to have a third width W3 larger than the first width W1 as at least a portion of the bendable member received in the second space 3201 of the second housing 310 is moved to have an additional second width W2. For example, the display 330 may have a display area substantially corresponding to the first width W1 in the slide-in state, and may have an extended display area substantially corresponding to the third width W3 in the slide-out state.

According to various embodiments, a slide-in/slide-out operation of the electronic device 300 may be automatically preformed. For example, in the case of detecting a triggering operation for converting from the slide-in state into the slide-out state or from the slide-out state into the slide-in state when a driving module is not operated, the electronic device 300 may operate the driving module disposed inside the electronic device 300. According to various embodiments, the triggering operation may include an operation of detecting a moving distance by which the second housing is moved by a push-pull section in a slide-in direction (e.g., ② direction). For example, the electronic device 300 may operate or stop the driving module through a driving motor control module operatively connected to a processor (e.g., the processor 120 in FIG. 1) and controlling a driving motor of the driving module.

According to various embodiments, the electronic device 300 may include at least one of an audio input device (e.g., a microphone 303), an audio output device (e.g., a call receiver 306 or a speaker 307), a sensor module 304, a camera module 305, a connector port 308, a key input device (not shown), or an indicator (not shown) each of which is disposed in the first space 3101 of the first housing 310. For another embodiment, the electronic device 300 may be configured to omit at least one of the above-described components or additionally include other components. For another embodiment, at least one of the aforementioned components may be disposed in the second space 3201 of the second housing 320.

According to other embodiments, the input device may include the microphone 303. In various embodiments, the input device (e.g., the microphone 303) may include multiple microphones arranged so as to detect a direction of a sound. The sound output device may include, for example, the call receiver 306 and the speaker 307. According to various embodiments, the speaker 307 may face the outside through at least one speaker hole formed through the first housing 310 in the slide-out state. According to various embodiments, the connector port 308 may face the outside through at least one connector hole port formed through the first housing 310 in the slide-out state. In some embodiments, the call receiver 306 may include a speaker (e.g., a piezo speaker) operating without a separate speaker hole.

The electronic device 300 according to various embodiments may include a driving module disposed in an internal space (e.g., the second space 3201) for the slide-in/slide-out operation. According to various embodiments, the electronic device 300 may use a push-pull operation as the triggering operation for driving the driving module. For example, in the case of detecting a triggering operation for pressurizing by the push-pull section in the slide-in direction (e.g., ② direction) of the second housing 300 without driving the driving module in the slide-in state, the electronic device 300 may automatically slide-out of the second housing 320 through the driving module (a push and pull-out operation) (e.g., the slide-out operation). According to various embodiments, in the case of detecting a triggering operation for pressurizing by the push-pull section in the slide-in direction (e.g., ② direction) of the second housing 300 without driving the driving module in the slide-out state, the electronic device 320 may automatically slide-in the second housing 300 through the driving module (a push and pull-int operation) (or the slide-in operation). Accordingly, the electronic device 300 may provide an intuitive means (switching means) for the slide-in/slide-out operation to the user so as to provide intuitive and new experience and help to improve convenience of use.

According to various embodiments, the electronic device 300 may include at least one antenna module A1 or A2 capable of transmitting or receiving a wireless communication signal from the outside. For example, the electronic device 300 may include a first antenna module A1 disposed on an upper area and a second antenna module A2 disposed on a lower area. Each antenna module A1 or A2 may include multiple antenna elements. According to various embodiments, the electronic device 300 may further include at least one antenna disposed on the second lateral surface 3112 of the first housing 310 and/or the fifth lateral surface 3212 of the second housing 320.

According to various embodiments, the first antenna module A1 may include a first conductive part 381 segmented through at least one non-conductive part 3811 or 3112 on the third lateral surface 3113 of the first lateral member 311. According to various embodiments, the first conductive part 381 may be disposed to be segmented through a first non-conductive part 3811 and a second non-conductive part 3812 spaced a designated distance apart from each other and may be electrically connected to a wireless communication circuit (e.g., the wireless communication module 192 in FIG. 1). According to various embodiments, the second antenna module A2 may include a second conductive part 391 segmented through at least one non-conductive part 3911 or 3212 on the first lateral surface 3111 of the first lateral member 311. According to various embodiments, the second conductive part 391 may be disposed to be segmented through a third non-conductive part 3911 and a fourth non-conductive part 3912 spaced a designated distance apart from each other and may be electrically connected to the wireless communication circuit (e.g., the wireless communication module 192 in FIG. 1).

According to various embodiments, each antenna module A1 or A2 may support wireless communication in different frequency bands. According to various embodiments, at least one of the antenna modules A1 or A2 may be used for multiple wireless communication technologies (e.g., Wi-Fi and Bluetooth) using the same frequency band (e.g., 2.4 Gz).

According to various embodiments, in the case that the electronic device 300 is changed from the slide-out state to the slide-in state, at least a portion of the antenna modules may be covered by a structure of the electronic device 300 of a user's hand or may have a change in an electrical structure. Accordingly, strength of a signal transmitted or received through the antenna modules may be weaker in the slide-in state than the slide-out state.

Figure 4:
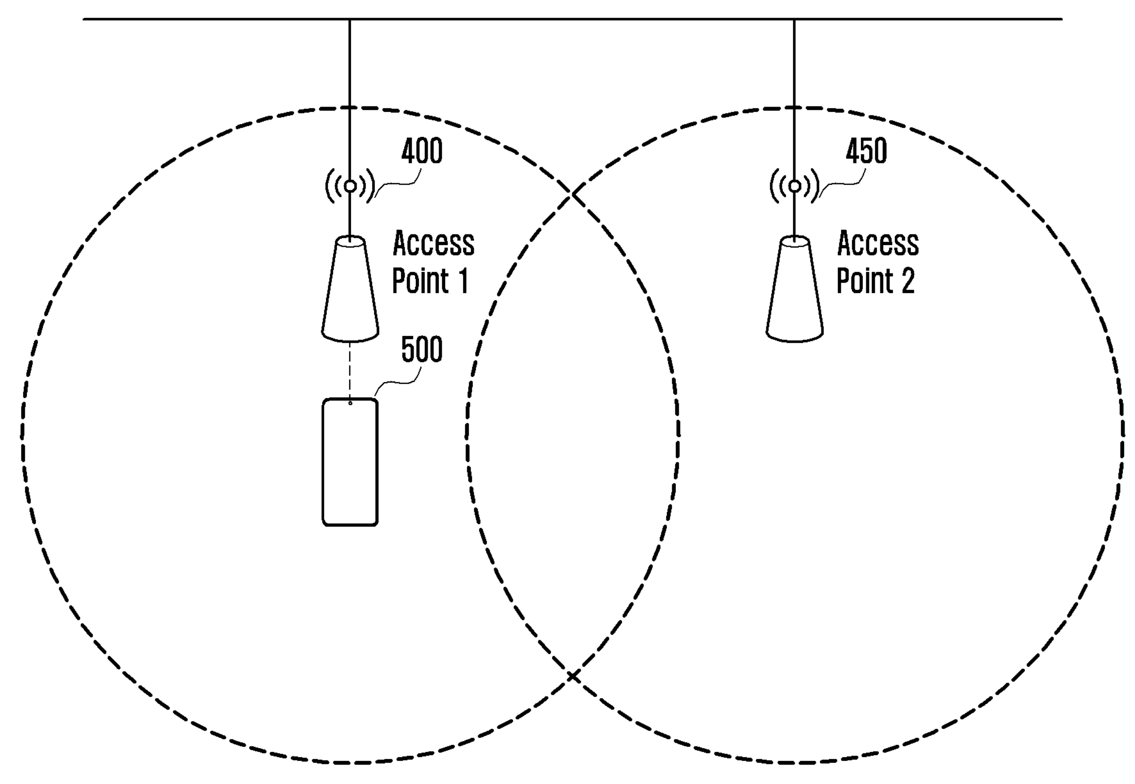
FIG. 4 illustrates an electronic device and an access point according to various embodiments of the present disclosure.

FIG. 4 illustrates an electronic device and an access point according to various embodiments.

According to various embodiments, the electronic device 500 may support wireless LAN communication (or Wi-Fi). The electronic device 500 may transmit or receive data to or from an adjacent access point by using wireless LAN communication and may access an external network (e.g., the second network 199 in FIG. 1) through the access point. The electronic device 500 may perform communication with the access point by using the IEE 802.11 standard technology and hereinafter, a description of a content disclosed in the IEE 802.11 standard will be omitted.

According to various embodiments, the electronic device 500 may attempt to perform connection with an adjacent access point in the case of initial turn on or activation of a wireless LAN function. For example, the electronic device 500 may find an access point which may provide the best communication quality under current conditions through a scanning process and may establish connection through an authentication process.

According to various embodiments, after establishing connection with a specific access point, the electronic device 500 may perform roaming by using connection with another access point. Here, the roaming may indicate connecting with another access point among access points within a previously connected network (e.g., a network having an identical service set identifier (SSID) and identical key management) by performing a handover.

A message transmission/reception process in the case of an initial connection of the electronic device 500 with an access point or performing roaming will be described in detail in FIG. 9.

Referring to FIG. 4, a first access point 400 and a second access point 450 may be connected to each other through a wired network and may have an identical SSID and key management. The first access point 400 and the second access point 450 may be disposed different on indoor locations and may each have coverage, and a portion of coverage may overlap each other.

Referring to FIG. 4, in the case that a current location of the electronic device 500 is within the coverage of the first access point 400, the electronic device may identify the first access point 400 having the best signal strength through a scanning process and establish connection within first access point 400. Thereafter, in the case that the user moves into the coverage of the second access point 450 with the electronic device 500, the electronic device 500 may identify the second access point 450 through a scanning process and attempts roaming to the second access point 450.

Figure 5:
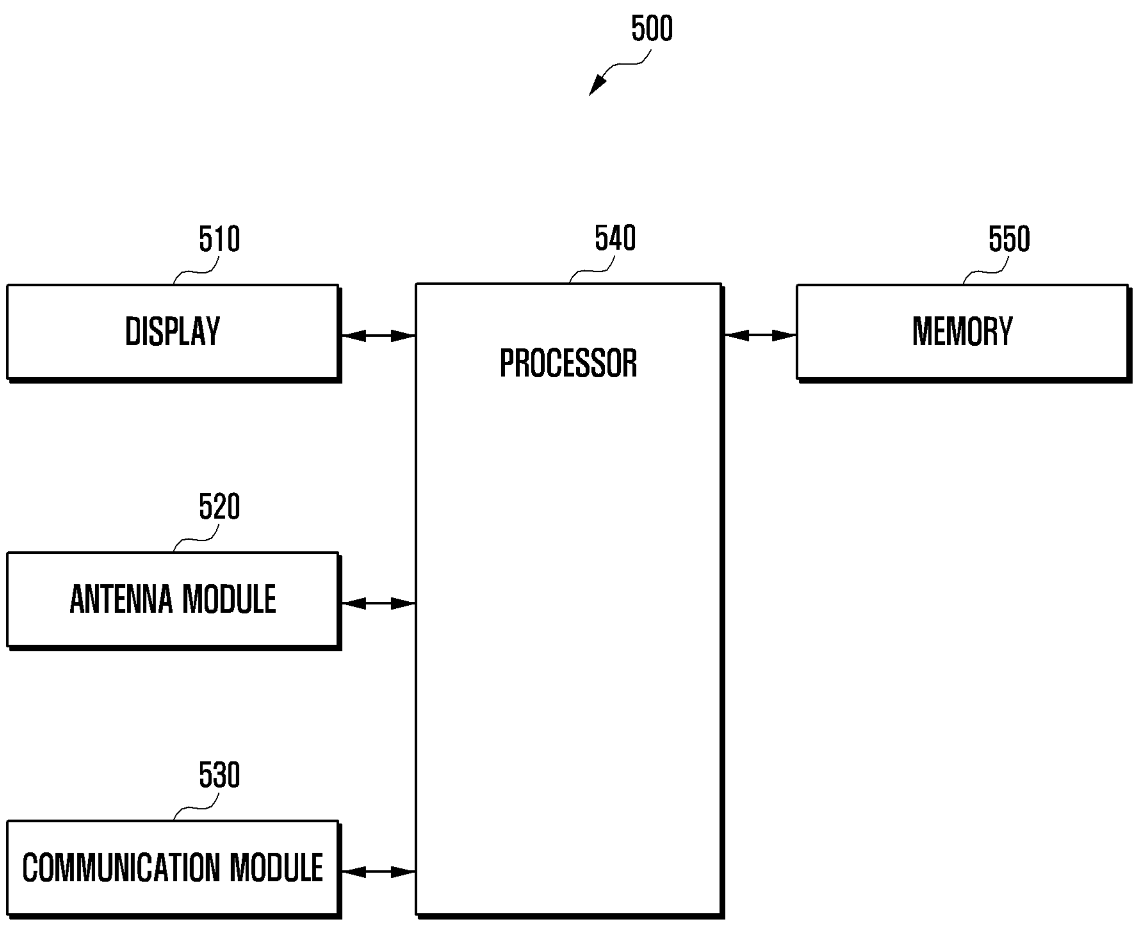
FIG. 5 shows a block diagram illustrating an electronic device according to various embodiments of the present disclosure.

FIG. 5 is a block diagram illustrating an electronic device according to various embodiments.

Referring to FIG. 5, the electronic device 500 may include a display 510, an antenna module 520, a communication module 530, a processor 540, and a memory 550, and even if some of the components are omitted or substituted, various embodiments of the disclosure may be implemented. The electronic device 500 may include a foldable type electronic device (e.g., the electronic device 200 in FIG. 2A and FIG. 2B) or a rollable type electronic device (e.g., the electronic device 300 in FIG. 3A and FIG. 3B). The electronic device 500 may further include at least a portion of the configuration or function of the electronic device 101 in FIG. 1.

According to another embodiment, the display 510 may display image data provided from the processor 540. The display 510 may include a display panel (not shown) having multiple pixels formed thereon and a display 510 driving circuit (not shown) for driving the display panel (not shown). The display 510 may include an organic light-emitting diode (OLED) display but is not limited thereto. The display 510 may further include at least a portion of the configuration or function of the display module 160 in FIG. 1.

According to various embodiments, the display 510 may be realized as a flexible display, at least a portion of which is flexible and may be exposed to the outside to change a display area for displaying image information. For example, in the case that the electronic device 500 is realized as a foldable type electronic device (e.g., the electronic device 200 in FIG. 2A and FIG. 2B), the display 510 (e.g., the first display 230 in FIG. 2A) is not exposed to the outside in a folding state so that the whole area of the display 510 may be deactivated and is exposed to the outside in a unfolding state so that the whole area of the display 510 may display image information.

Hereinafter, the case in which the display 510 is in the unfolded state (or the unfolding state) may be defined as a first state, and the case in which the display is in the folded state (or the folding state) may be defined as a second state.

In the case that the electronic device 500 is implemented as a rollable type electronic device 500 (e.g., the electronic device 300 in FIG. 3A and FIG. 3B), a first part of the display 510 (e.g., the display 330 in FIG. 3A) may be exposed to the outside to display image information in the slide-in state and at least a portion of a second part may be additionally exposed to the outside in the slide-out state so that image information may be displayed on the first part and the second part. Hereinafter, the case in which the display 510 is in the slide-out state may be defined as a first state, and the case in which the display is in the slide-in state may be defined as a second state.

According to various embodiments, the antenna module 520 may transmit a signal to an external device or receive a signal transmitted by an external device. The antenna module 520 may include multiple antenna elements. The electronic device 500 may include multiple antenna modules and each antenna module 520 may support a different frequency band or may support the same frequency band. At least one antenna module 520 may be used for multiple wireless communication technologies (e.g., Wi-Fi and Bluetooth)

using the same frequency band (e.g., 2.4 Gz). The antenna module 520 may include at least a portion of the configuration or function of the antenna module 197 in FIG. 1.

According to various embodiments, the antenna module 520 may be disposed on a rear surface of the display 510 inside a housing of the electronic device 500. For example, in the case that the electronic device 500 is implemented as a foldable type electronic device 500 (e.g., the electronic device 200 in FIG. 2A and FIG. 2B), the antenna module 520 may be disposed on a rear surface of an area at an upper end of the display 510 inside a first housing or a second housing. In the case that the electronic device 500 is implemented as a rollable type electronic device 500 (e.g., the electronic device 300 in FIG. 3A and FIG. 3B), the antenna module 520 may be disposed on a rear surface of an area at an upper end of the display 510 inside a housing. The arrangement location of the antenna module 520 is not limited thereto.

According to various embodiments, the electronic device 500 may include multiple antenna modules and each antenna module may be disposed in a different location. For example, a first antenna module may be disposed on a first housing (e.g., the first housing 210 in FIG. 2A and FIG. 2B) and a second antenna module may be disposed on a second housing (e.g., the second housing 220 in FIG. 2A and FIG. 2B). Accordingly, in the case that a display area of the display 510 is changed from the first state (e.g., the unfolding state) to the second state (e.g., the folding state) or vice versa, a distance between the first antenna module and the second antenna module may be changed.

According to various embodiments, the communication module 530 may perform wireless LAN communication with an external access point (e.g., the first access point 400 and the second access point 450 in FIG. 4). The communication module 530 may support establishment of a wireless communication channel with an access point and transmission/reception of data through the established communication channel. The communication module 530 may include a communication processor and the communication processor may operate independently from the processor 540. The communication module 530 may support other types of wireless communication, such as cellular communication (e.g., 4G LTE, or 5G NR) and Bluetooth, in addition to the wireless LAN communication. The communication module 530 may include at least a portion of the configuration or function of the communication module 190 in FIG. 1.

According to various embodiments, the communication module 530 may establish communication connection with an external access point. For example, the communication module 530 may scan at least one adjacent access point and attempt to perform connection with a connection candidate access point through authentication, association, and 4-way handshake processes. Furthermore, in the case that the electronic device 500 moves out of coverage of a specific access point in a state of being connected to the access point, the communication module 530 may identify degradation of a communication quality and attempt roaming to another access point for providing better quality communication. The connection process of the electronic device 500 with an access point (e.g., initial connection or roaming) will be described in detail in FIG. 9.

According to various embodiments, the memory 550 may include a well-known volatile memory and non-volatile memory. The memory 550 may store various instructions executable by the processor 540. The instructions may include control commands, such as arithmetic and logic operations, data movement, and input/output, which may be recognized by the processor 540. The memory 550 may include at least a portion of the structure and/or function of the memory 130 in FIG. 1 and may store at least a portion of the program 140 in FIG. 1.

According to various embodiments, the processor 540 corresponds to a component capable of performing calculation or data processing for control and/or communication of one or more components of the electronic device 500 and may include at least a portion of components of the processor 120 in FIG. 1. The processor 540 may be operatively, electrically, and/or functionally connected to internal components of the electronic device 500, such as the display 510, the communication module 530, the antenna module 520, and the memory 550.

According to various embodiments, there is no limitation to calculation and data processing functions realized by the processor 540 in the electronic device 500 and various embodiments for performing data communication in a better environment by finding an optimum access point and communication link when a display area of the display 510 is changed (or a state is changed) will be described in the disclosure. Operations of the processor 540 to be described below may be performed according to execution of instructions stored in the memory 550. At least a portion of operations of the processor 540 to be described below may be performed by the communication processor of the communication module 530.

According to various embodiments, the processor 540 may detect a change of a display area of the display 510. For example, the processor 540 may detect a change from the first state having relatively superb communication quality to the second state having a relative inferior communication quality or from the second state to the first state.

According to various embodiments, in the case that the electronic device 500 corresponds to a foldable type electronic device, the processor 540 may identify a change of an angle between a first area disposed in the first housing of the display 510 and a second area disposed in the second housing. The processor 540 may determine that a display area of the display 510 is in the first state in the case that the angle between the first area and the second area of the display 510 is equal to or more than a reference angle, and determine that a display area of the display 510 is in the second state in the case that the angle is less than the reference angle. That is, processor 540 may determine the change of a display area in the case that the angle between the first area and the second area of the display 510 becomes larger or smaller than the reference angle.

According to various embodiments, in the case that the electronic device 500 corresponds to a rollable type electronic device, the processor 540 may determine that a display area of the display 510 is in the first state when a length of the display 510 extends to be more than a reference length and determine that a display area of the display 510 is in the second state when the length of the display is reduced to be less than the reference length. That is, processor 540 may determine the change of a display area in the case that the extended length of the display 510 becomes larger or smaller than the reference length.

According to various embodiments, in the case that the display area of the electronic device 500 is changed, at least a portion of the antenna modules 520 may be covered by a structure of the electronic device 500 of a user's hand or may have a change in an electrical structure. Accordingly, in the case that the display 510 is changed from the first state (e.g., the unfolded state of a foldable display and the slide-out state of a rollable display) to the second state (e.g., the folded state of a foldable display and the slide-in state of a rollable display), strength of a signal transmitted or received through the antenna module 520 may be weakened.

Table 1 below shows performance-measurement results in a radio frequency (RF) test chamber in the unfolded state and the folded state of the display 510 in a foldable type electronic device 500.

TABLE 1

| Unit: | Unfolded (Open) | | Folded (Close) | | Difference | |
|---|---|---|---|---|---|---|
| dBm | TRP | TIS | TRP | TIS | TRP difference | TIS difference |
| 11b_2.4 G | 17.9 | 87.9 | 15.5 | 86.2 | 2.4 | 1.7 |
| 11a_5 G | 13.5 | 71.6 | 12.2 | 70.7 | 1.2 | 0.9 |
| 11ax_6 G | 3.9 | 56.9 | 3.1 | 56.3 | 0.8 | 0.6 |

In Table 1, TRP may indicate "total radiated power" and TIS may indicate "total isotropic sensitivity."

Referring to Table 1, TRP and TIS in the unfolded state were measured to be better than those in the folded state with a difference of about 1-3 decibel-milliwatts (dBm).

As such, in the case that a display area is changed, strength of a signal transmitted or received through the antenna module 520 is changed to cause a change in the communication environment, and thus the electronic device 500 may trigger an operation for providing a superior communication environment when a display area of the display 510 is changed.

According to various embodiments, in the case of detecting a change of a display area of the display 510, the processor 540 may trigger an operation for connecting to an access point through a communication channel (or link) having a higher communication quality.

According to various embodiments, in the case of detecting a change of a display area of the display 510, the processor 540 may scan at least one adjacent access point by using the communication module 530 and the antenna module 520. For example, the scan operation may include an operation of broadcasting a probe request and receiving a probe response from an access point.

The operation of the processor 540 for connecting to an access point through a communication channel (or link) having a higher communication quality may be determined according to a current operation state of the electronic device 500.

According to various embodiments, in the case of detecting a change (e.g., folding or unfolding of a foldable display and extension or contraction of a rollable display) in a display area of the display 510 in a state in which connection to an access point (e.g., the first access point in FIG. 4) is not established, the processor 540 may be configured to scan at least one adjacent access point by using the antenna module 520 and/or the communication module 530. For example, in the case that the display area of the display 510 is changed from the second state to the first state, RF performance of the antenna module 520 may be improved and thus the processor 540 may perform scanning to attempt connection with an access point. According to various embodiments, in the case that the display area of the display 510 is changed from the second state to the first state or changed from the first state to the second state, the processor 540 may perform all of the above-described scanning.

According to various embodiments, the processor 540 may attempt to perform connection to an optimum access point based on at least one of an estimated throughput (ETP), a received signal strength indicator (RSSI), or channel utilization (CU), by scanning an adjacent access point. Here, the ETP may indicate an amount of data transmission per unit time that is expected during data communication and the RSSI may indicate strength of a received wireless signal, and the CU may indicate a usage rate of a wireless channel and may be a value directly affecting throughput. The ETP may be a suitable value for measuring a quality of a network because the larger the corresponding value is, the faster data communication is possible during data communication. The processor 540 may select an access point for transmitting a signal having a highest ETP as an optimum connection candidate access point and may use various conditions for selecting a connection candidate access point in addition thereto. The processor 540 may select an access point of which an ETP value is higher than a reference ETP or signal strength is higher than a reference, add the access point to a candidate access point list, and sequentially attempt connection to each access point in the list. According to various embodiments, the reference ETP (or reference RSSI or reference CU) may change according to various conditions, such as current RF performance, a state of charge of a battery, an operating mode (e.g., low power mode), and a transmission rate required by an application being executed of the electronic device 500.

An example method of the electronic device 500, which incorporates features of the present disclosure for attempting initial connection in a state of being disconnected from an access point will be described in detail in FIG. 6 to FIG. 9.

According to various embodiments, in the case that the display area of the display 510 is changed in a state in which connection to a specific access point (e.g., the first access point 400 in FIG. 4) is established, the electronic device 500 may attempt roaming to another access point other than the currently connected access point. For example, in the case that the foldable type display 510 is changed from the folded state to the unfolded state, there may be an access point with better signal strength by removing obstacles, such as the display 510 and the like, located around an antenna, roaming may be triggered to attempt handover to an access point having better signal strength. Furthermore, in the case that the display 510 is changed from the unfolding state to the folding state, an obstacle may be formed around the antenna to weaken signal strength and thus roaming may be attempted to an access point having better signal strength.

According to various embodiments, in the case that the display area of the display 510 is changed, the electronic device 500 may attempt roaming to an access point for transmitting a signal in a difference frequency band. In the case of a wireless signal, the higher the frequency, the lower the transmittance and, for example, as a frequency increases to 2.4 GHz, 5 GHz, and 6 GHz supported by the electronic device 500, the transmittance to an obstacle may decrease. In the case that the display area of the display 510 is changed to form an obstacle around the antenna, a signal in a high frequency band having a high transmittance may be significantly affected by signal strength.

According to various embodiments, in the case that the display 510 is unfolded in a state in which the electronic device is connected to an access point in a 2.4 GHz band, since a signal quality of a 5 GHz band or 6 GHz band, which is significantly affected by obstacles, is expected to be improved, the electronic device 500 may trigger roaming and attempt roaming to an access point for transmitting a signal in the 5 GHz band or 6 GHz band.

According to various embodiments, in the case that the display 510 is folded in a state in which the electronic device is connected to an access point in a 5 GHz band or 6 GHz band, since a signal quality of a 2.4 GHz band, which is less affected by obstacles, is expected to be relatively less degraded, the electronic device 500 may trigger roaming and attempt roaming to an access point for transmitting a signal in the 2.4 GHz band.

According to various embodiments, the processor 540 may measure a quality of a signal received from a specific access point for a predetermined time in a state in which connection to the specific access point (e.g., the first access point 400 in FIG. 4) is established and attempt roaming to another access point in the case that a signal quality measured for the predetermined time is less than a first reference value. In the case of detecting a change of a display area of the display 510 in a state in which connection to a specific access point is established, the processor 540 may attempt roaming to another access point (e.g., the second access point 450 in FIG. 4) before a predetermined time has elapsed. The processor 540 may select an access point having an ETP of a received signal greater than or equal to a reference ETP, an RSSI greater than or equal to a reference RSSI, and/or CU greater than or equal to reference CU as a candidate, and determine whether to proceed with roaming by comparing those of the candidate with an ETP, RSSI, and/or CU of a received signal of a currently connected access point.

The roaming operation in a weak electric field situation may correspond to an operation for roaming to another access point in the case that strength of a signal received through an access point is weakened or data communication with a connected access point is difficult, for example, receiving a de-authentication or dis-association frame from the connected access point.

A method of the electronic device 500 of the embodiment for attempting roaming in a weak electric field situation will be described in detail in FIG. 10.

According to various embodiments, in the case that a predetermined condition is satisfied in a state in which connection with a specific access point is established, the processor 540 may attempt roaming to another access point by using a first number of samples acquired during a first time from a signal received from the specific access point.

According to various embodiments, in the case of detecting a change of a display area of the display 510 in a state in which connection with a specific access point is established, the processor 540 may attempt roaming to another access point by using a second number of samples, which is smaller than the first number acquired during a second time shorter than the first time from a signal received from the specific access point.

The roaming operation in a strong electric field situation may correspond to a process of scanning to attempt roaming in the case that data communication with a currently connected access point is possible but a current network is monitored to find an access point with a better condition and a predetermined condition is satisfied. In the case of roaming in a strong electric field, unnecessary scanning may slow down the Internet, increase latency, and/or cause disconnection with an access point. To prevent this, the electronic device 500 may perform network monitoring for a predetermined time or longer to check whether communication with a currently used network is in a stable state.

According to various embodiments, the processor 540 may perform monitoring with respect to an RF state during a predetermined time (e.g., the first time) to identify whether a trigger condition of a strong electric field is satisfied. The reason for monitoring the RF state for a predetermined time is to identify whether an RF state measured in the corresponding situation is reliable through repeated measurements. In the case that a state of the display 510 is changed in the electronic device 500, an RF state change is clearly distinguished and thus monitoring an RF state for a predetermined time for reliability is not necessary. Accordingly, in the case that the display area of the display 510 is changed, the processor 540 may reduce monitoring time for identifying whether a trigger condition of a strong electric field roaming is satisfied and perform monitoring immediately or for a short time (e.g., the second time).

A method of the electronic device 500 of the embodiment for attempting roaming in a strong electric field situation will be described in detail in FIG. 11 and FIG. 12.

According to various embodiments, the processor 540 may be configured to transmit an Internet connection request according to a predetermined polling period in the case that there is no Internet connection in a state in which connection to a specific access point is established and transmit an Internet connection request before the polling period has elapsed in the case of detecting a change of the display area of the display 510.

A method of the electronic device 500 of the embodiment for attempting to connect to the Internet in a situation in which the Internet is not working will be described in detail in FIG. 13.

According to various embodiments, the electronic device 500 may support a multi-link operation (MLO). The MLO may indicate a method for concurrently transmitting and receiving data by forming multiple links between two devices connected through wireless LAN communication. The electronic device 500 and an access point may form multiple links belonging to the unlicensed frequency bands of 2.4 GHz, 5 GHz, and 6 GHz through the MLO.

According to various embodiments, in the case of detecting a change of the display area of the display 510 in a state of being connected to an access point by using multiple MLO links, the processor 540 may be configured to add an MLO link or change at least one of the multiple MLO links in use to a link in another frequency band.

A method of the electronic device 500 of the embodiment for changing an MLO link will be described in detail in FIG. 15.

According to various embodiments, in the case of identifying an available MLO link according to a change of the display area of the display 510, the processor 540 may be configured to release connection using the identified MLO link.

A method of the electronic device 500 of the embodiment for removing an MLO link will be described in detail in FIG. 16.

According to various embodiments, in the MLO operation, the electronic device 500 may operate in a simultaneous transmit and receive operation (STR) mode or a non-STR mode. Here, the STR mode may correspond to a mode for independently operating multiple links constituting the MLO without interference and the electronic device 500 may at least partially perform signal transmission to an access point and signal reception from an access point through difference links. Whereas the non-STR mode may correspond to a method for receiving a signal after transmitting a signal through all links without concurrently performing transmission and reception of each link.

According to various embodiments, in the case that the display area of the display 510 is changed during the MLO operation, the processor 540 may change an operation mode from the STR mode to the non-STR mode or from the non-STR mode to the STR mode. For example, in the case that the electronic device 500 includes two antenna modules and each antenna module is disposed in a first housing (e.g., the first housing 210 in FIG. 2A and FIG. 2B) and a second housing (e.g., the second housing 220 in FIG. 2A and FIG. 2B), a distance between the two antennas may be long in the unfolding state of the display 510 and a distance between the two antennas may be short in the folding state. According to various embodiments, the processor 540 may control to operate in the STR mode because the distance between the two antennas is long, thus causing low signal interference risk in the unfolding state of the display 510 and to operate in the non-STR mode because the distance between the two antennas is short, thus causing high signal interference risk in the case that the display is changed to the folding state thereafter. According to various embodiments, in the case of changing from the STR mode to the non-STR mode (or vice versa), the processor 540 may transmit information indicating an operation mode change to an access point. The information indicating an operation mode change may be included in an action frame among management frames defined in IEEE 802.11. According to another embodiment, the processor 540 may operate in the non-STR mode in the unfolding state and operate in the STR mode in the folding state.

Among above-described operations of the processor 540, at least a portion of the operation of scanning an adjacent access point, establishing connection with an access point, and/or performing data communication may be performed by the communication processor of the communication module 530.

According to various embodiments, in the case that initial connection with an access point is established or roaming to another access point is completed after the display area of the display 510 is changed, a graphic notification indicating this may be displayed on the display 510.

Figure 6:
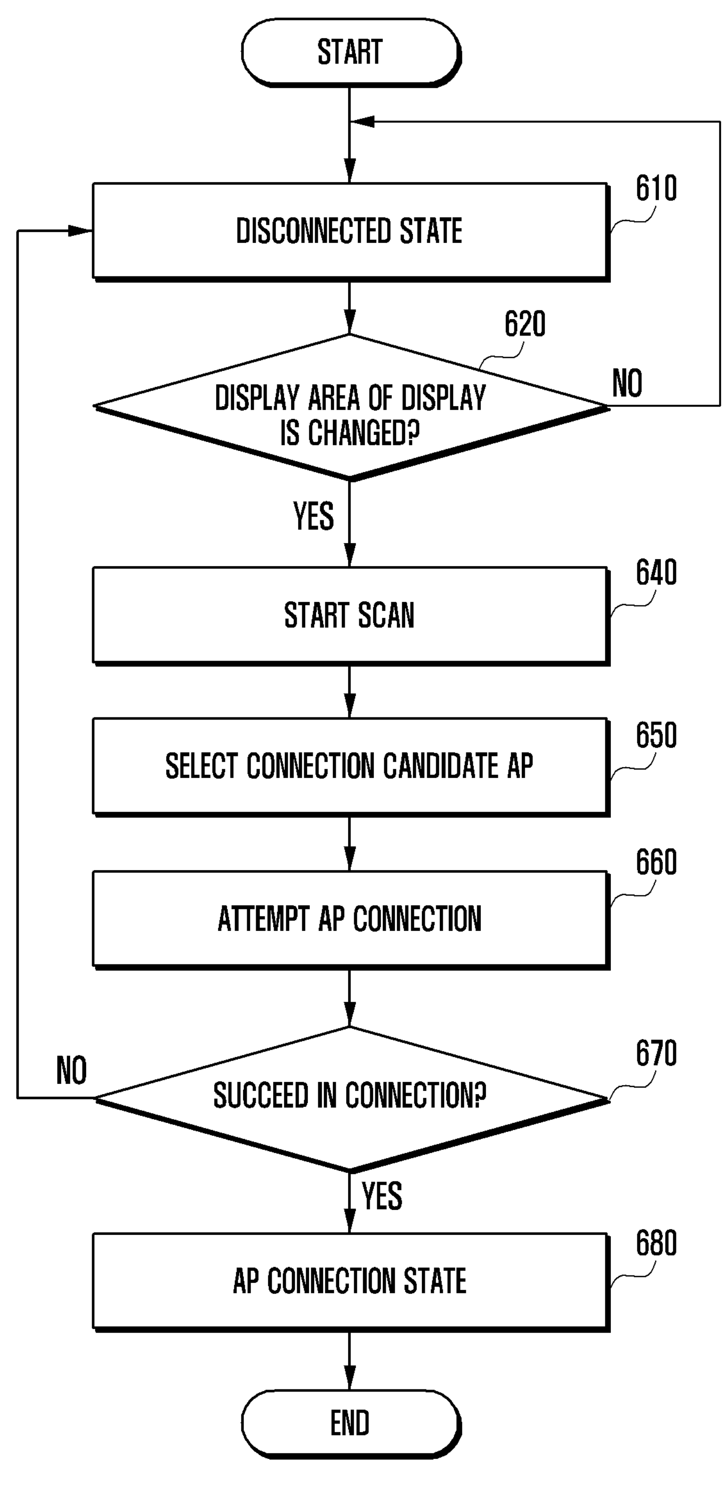
FIG. 6 shows a flowchart for illustrating a method for attempting initial connection in a state in which an electronic device is disconnected from an access point device according to various embodiments of the present disclosure.

FIG. 6 shows a flowchart for illustrating a method for attempting initial connection in a state in which an electronic device is disconnected from an access point device according to various embodiments.

The method shown in the drawing may be performed by an electronic device (e.g., the electronic device 500 in FIG. 5) and, in some embodiments, the electronic device may include a foldable type electronic device (e.g., the electronic device 200 in FIG. 2A and FIG. 2B) or a rollable type electronic device (e.g., the electronic deice 300 in FIG. 3A and FIG. 3B).

According to various embodiments, in the case of detecting a change (e.g., folding or unfolding of a foldable display and extension or contraction of a rollable display) in a display area of a display (e.g., the display 510 in FIG. 5) in a state in which connection to an access point (e.g., the first access point 400 in FIG. 4) is not established, a processor (e.g., the processor 540 in FIG. 5) may be configured to scan at least one adjacent access point by using an antenna module (e.g., the antenna module 520 in FIG. 5) and a communication module (e.g., the communication module 530 in FIG. 5).

According to various embodiments, in operation 610, the electronic device may be in a state of being disconnected from an access point device. For example, the electronic device may be in a state of being disconnected from a specific access point or in a state of not completing initial connection after a wireless LAN function is activated.

According to various embodiments, in operation 620, the electronic device may identify whether the display area of the display is changed. According to various embodiments, the electronic device may identify whether the display area of the display is changed from a first state to a second state. Here, the first state may indicate a state in which the display area of the display is larger than that of the second state and RF performance (or a signal quality) of the antenna module may be better in the first state than in the second state. For example, in the case that the electronic device corresponds to a foldable type electronic device (e.g., the electronic device 200 in FIG. 2A and FIG. 2B), a folded state in which an angle between a first area (e.g., the first area 230*a* in FIG. 2A) and a second area (e.g., the second area 230*b* in FIG. 2A) of the display is less than a reference angle may correspond to the second state, an unfolded state in which an angle between the first area and the second area is equal to or more than the reference angle may correspond to the first state, and RF performance may be better in the case of changing from the folded state (or the second state) to the unfolded state (or the first state). In the case that the electronic device corresponds to a foldable type electronic device (e.g., the electronic device 300 in FIG. 3A and FIG. 3B), a slide-in state in which the display is contracted to have a length less than a reference length may correspond to the second state, a slide-out state in which the display is extended to have a length equal to or larger than the reference length may correspond to the first state, RF performance may be better in the case of changing from the slide-in state (or the second state) to the slide-out state (or the first state). According to various embodiments, in operation 620, the electronic device may proceed to operation 640 in the case that the display area of the display is changed from the first state to the second state or from the second state to the first state.

According to various embodiments, in operation 640, the electronic device may scan at least one adjacent access point. For example, the electronic device may broadcast a probe request to at least one adjacent access point and the at least one access point having received the probe request may transmit a probe response to the electronic device. Alternatively, the electronic device may identify a beacon signal broadcasted from an access point.

According to various embodiments, in the case that the display area of the display is not changed, the electronic device may trigger a scan process for finding an adjacent access point at predetermined intervals or when a wireless LAN function is activated (or Wi-Fi is turned on). That is, the electronic device may perform a scan process at predetermined intervals in a disconnected state, but may trigger a scan process in the case that the display area of the display is changed even if the predetermined interval has not elapsed.

According to various embodiments, in operation 650, the electronic device may select a connection candidate access point. For example, the electronic device may select, as a connection candidate, an access point having a best communication quality (e.g., the estimated throughput (ETP), the received signal strength indicator (RSSI), and the channel utilization (CU)) among at least one access point having transmitted a probe response. A method of the electronic device for selecting a connection candidate based on a communication quality will be described in detail in FIG. 7.

According to various embodiments, in operation 660, the electronic device may attempt connection with a selected connection candidate access point. For example, the electronic device may attempt to perform connection with a connection candidate access point through authentication, association, and 4-way handshake processes. The connection process of the electronic device with a connection candidate access point will be described in detail in FIG. 8 and FIG. 9.

According to various embodiments, the electronic device may identify whether connection of the electronic device succeeds in operation 670 and the electronic device and an access point may be configured to be in a connection state in operation 680. In the case that connection between the electronic device and an access point fails in operation 670, the electronic device may return to the disconnected state of operation 610 and perform a scan process again when the display area of the display is re-changed (operation 620) or when a predetermined interval elapses (operation 630).

Figure 7:
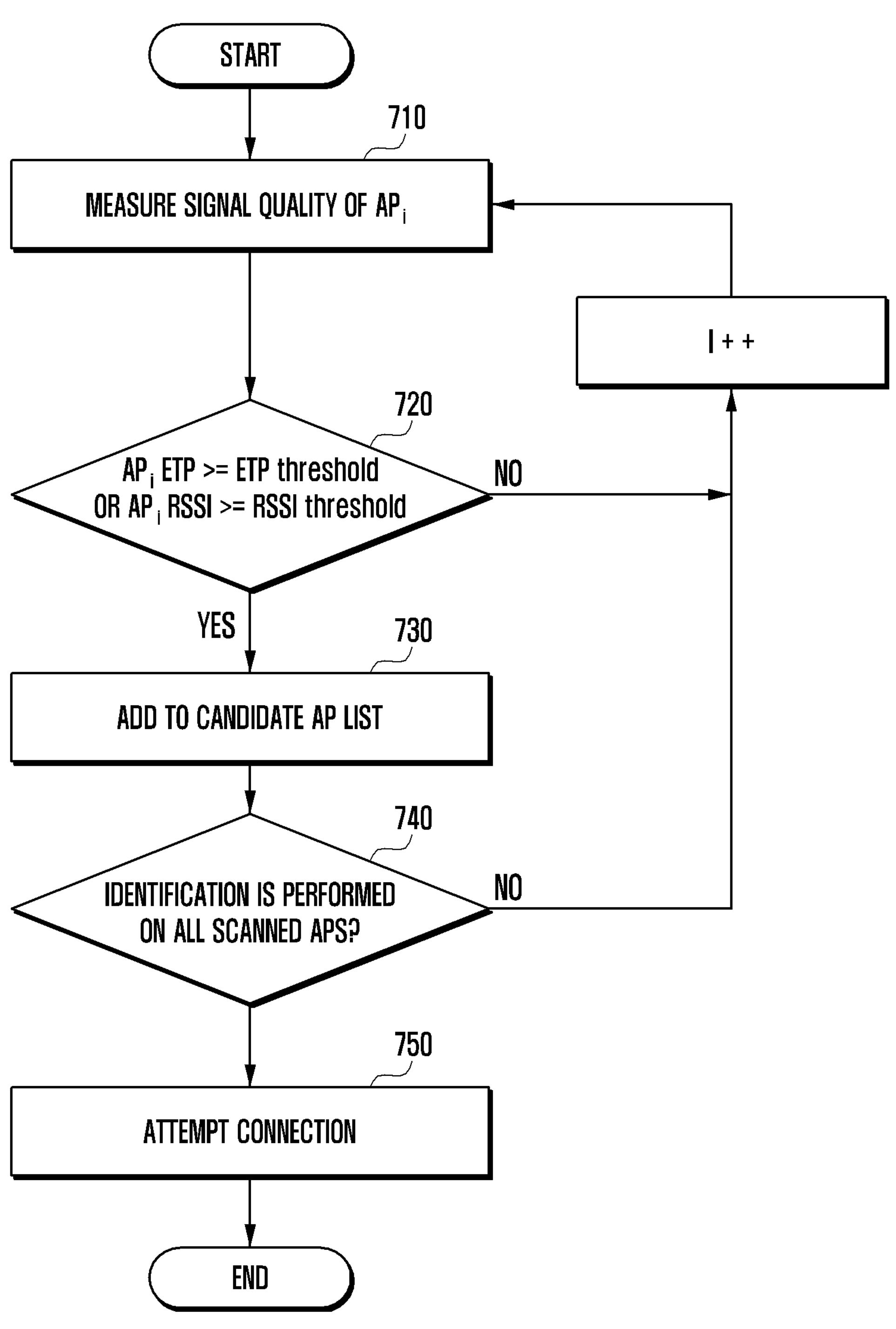
FIG. 7 shows a flowchart of a method in which an electronic device selects an access point to establish connection with according to various embodiments of the present disclosure.

FIG. 7 shows a flowchart of a method in which an electronic device selects an access point to establish connection with according to various embodiments.

The method described in the drawing relates to the operation of selecting a connection candidate access point (operation 650) of FIG. 6 and may be performed by an electronic device (e.g., the electronic device 500 in FIG. 5).

According to various embodiments, a processor (e.g., the processor 540 in FIG. 5) may be configured to measure a quality of a signal received from at least one adjacent access point (e.g., the first access point 400 and the second access point 450 in FIG. 4) in a scan process, add at least one access point of which a measured quality of a signal is higher than a reference value to a connection candidate list, and attempt connection establishment from an access point having a highest signal quality among at least one access point included in the connection candidate list. Here, the signal quality may include at least one of an estimated throughput (ETP), a received signal strength indicator (RSSI), or channel utilization (CU).

According to various embodiments, the electronic device may broadcast a probe request for finding an adjacent access point and the at least one access point having received the probe request may transmit a probe response to the electronic device.

According to various embodiments, in operation 710, the electronic device may measure a signal quality of an i-th access point among at least access point having transmitted the probe response. For example, the signal quality may include at least one of an estimated throughput (ETP), a received signal strength indicator (RSSI), or channel utilization (CU) without limitation thereto and one or more parameters indicating a reception signal quality may be used therefor.

The ETP may be calculated by Equation 1 below.

$$\text{ETP(RSSI,Airtime faction)=Airtime fraction/255data rate} \quad (1)$$

An equation for calculating the data rate in Equation 1 may refer to "R7. Calculating Estimated Throughput" in IEEE 802.11 standard 2020.

According to various embodiments, in operation 720, the electronic device may identify whether ETP (AP, ETP) of a signal of the i-th access point is equal to or more than an ETP threshold. Alternatively, the electronic device may identify whether RSSI (AP, RSSI) of a signal of the i-th access point is equal to or more than an RSSI threshold. The reference ETP (or reference RSSI or reference CU) may change according to various conditions such as current RF performance, a state of charge of a battery, an operating mode (e.g., low power mode), and a transmission rate required by an application being executed of the electronic device.

According to various embodiments, in the case that the ETP or RSSI of the signal of the i-th access point is equal to or larger than a reference value, in operation 730, the electronic device may add the i-th access point to a candidate access list (candidate AP list).

According to various embodiments, the electronic device may determine a priority of each access point in the candidate access point list and may configure a higher priority for a device having a higher signal quality, for example, the ETP or RSSI. According to other embodiments, the electronic device may select a candidate access point by using various conditions other than the communication quality such as the ETP and the RSSI.

According to various embodiments, in operation 740, the electronic device may identify whether all access points from which the probe response has been received have gone through operation 710 to operation 730. In the case that the identification is not performed on all access points, the electronic device may return to operation 710 and perform operation 710 to operation 730 to a next access point in the access points from which the probe response has been received. In the case that probe responses are received from n access points, the electronic device may iterate operation 710 to operation 740 n times.

According to various embodiments, in operation 750, the electronic device may attempt connection with an access point in the candidate access point list. For example, the electronic device may sequentially attempt connection from an access point having a highest priority (e.g., an access point having a highest ETP and/or RSSI) among at least one access point in the candidate access point list.

Figure 8:
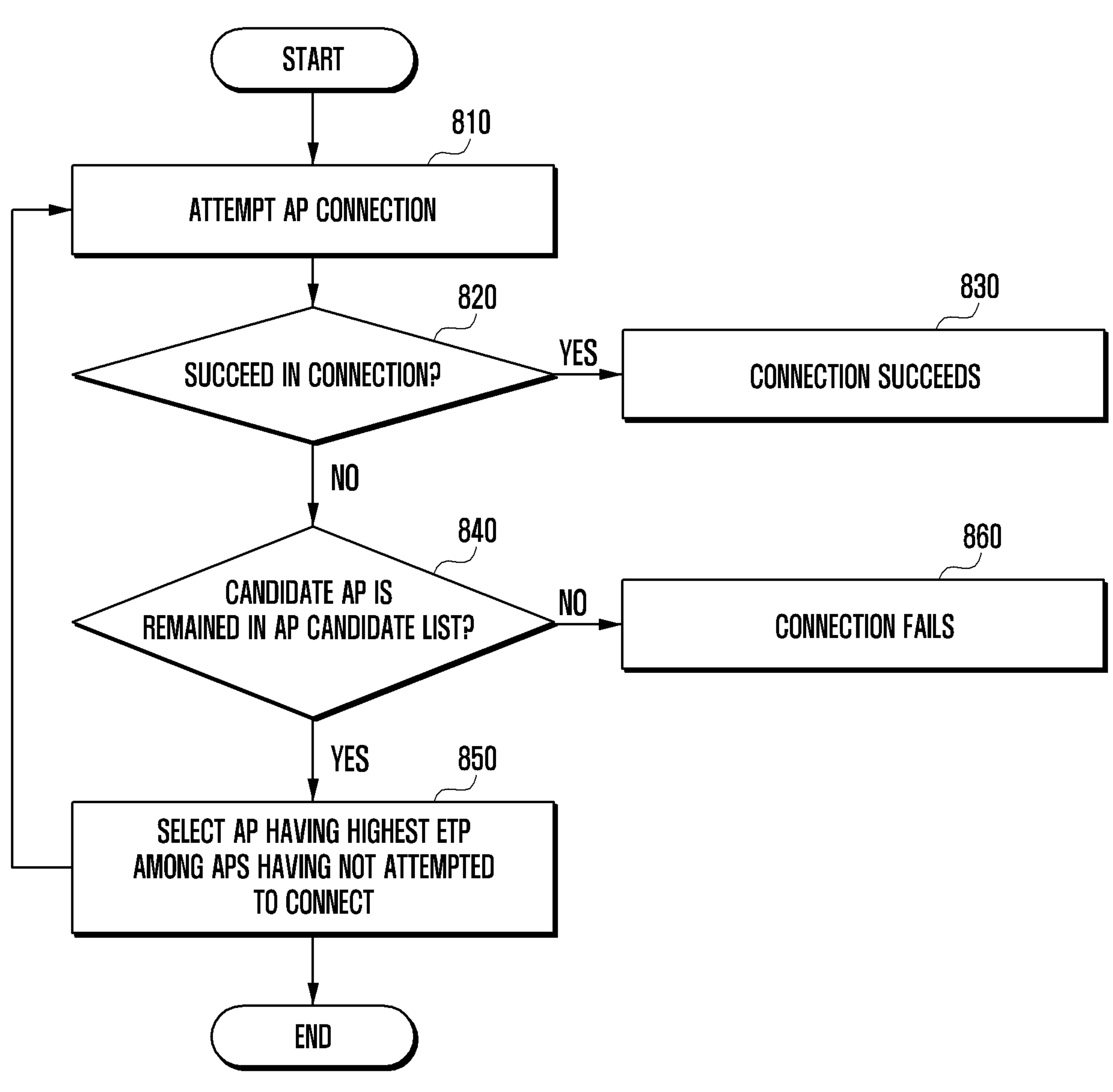
FIG. 8 shows a flowchart of a method in which an electronic device attempts to connect with an access point according to various embodiments of the present disclosure.

FIG. 8 shows a flowchart of a method in which an electronic device attempts to connect with an access point according to various embodiments of the present disclosure.

The method described in the drawing relates to the operation of attempting connection with a connection candidate access point (operation 660) of FIG. 6 and may be performed by an electronic device (e.g., the electronic device 500 in FIG. 5).

According to various embodiments, in operation 810, the electronic device may attempt connection with an access point device having a highest priority among access points in the candidate access point list. For example, the electronic device may determine a priority of each access point based on a signal quality, such as the ETP or RSSI.

According to various embodiments, in the case that connection with the corresponding access point device is successful in operation 820, the electronic device may transmit or receive data based on wireless LAN connection established with the corresponding access point device in operation 830.

According to various embodiments, in the case that connection with the corresponding access point device fails, the electronic device may identify whether there are any access points in the candidate access point list, with which connection has not been attempted in operation 840. For example, in the case that n access points are designated in the candidate access point list, connection may be attempted sequentially to n access points in priority order.

According to various embodiment, in the case that there are any access points in the candidate access point list, with which connection has not been attempted, an access point having a next highest priority (e.g., an access point having a highest ETP and/or RSSI) among remaining access points may be selected and it may be performed again from the connection attempt process of operation 810.

According to various embodiments, in the case that connection to all access points are attempted but fails, in operation 860, the electronic device may determine connection failure for a current candidate access point list, perform a scan process for finding an adjacent access point again immediately thereafter or when a predetermined interval elapses, or output a graphic notification on the display indicating a wireless LAN connection failure without making further connection attempts.

Figure 9:
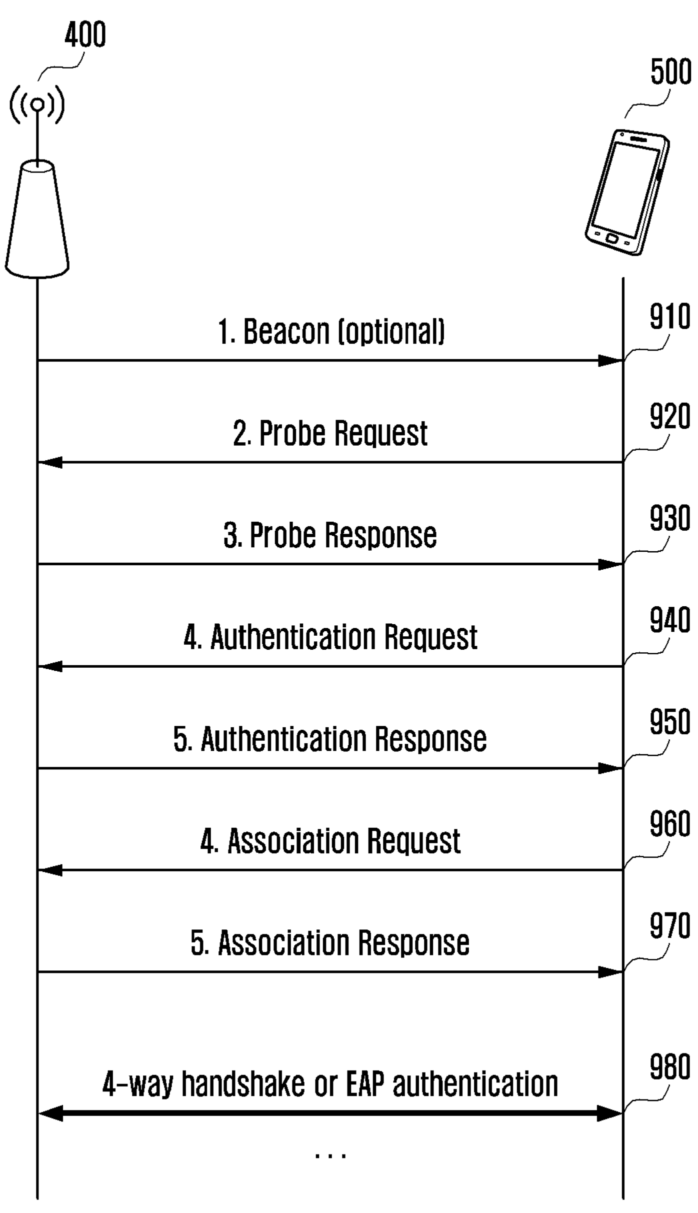
FIG. 9 illustrates information transmitted or received in a connection process between an electronic device and an access point according to various embodiments of the present disclosure.

FIG. 9 illustrates information transmitted or received in a connection process between an electronic device and an access point according to various embodiments.

FIG. 9 illustrates information (or a message) transmitted or received during a connection process between the electronic device 500 and the access point 400 in the case that the electronic device 500 attempts an initial connection with the access point 400 or attempts roaming to another access point 400.

According to various embodiments, the electronic device 500 may scan at least one adjacent access point 400 through a passive scanning method (operation 910) and/or an active scanning method (operation 920 and operation 930). In the case that the electronic device 500 scans at least one adjacent access point 400 through at least one of the passive scanning method or the active scanning method, remaining operations (e.g., operation 910 or operation 920 and operation 930) may be omitted.

According to various embodiments, in operation 910, the access point 400 may broadcast a beacon signal periodically. The beacon signal may include identification information (e.g., SSID) of the access point 400 and the electronic device 500 may passively scan the beacon signal broadcasted from the access point 400 to learn information on the access point 400.

According to other embodiments, in operation 920, the electronic device 500 may transmit a probe request to the access point 400 and in operation 930, the access point 400 may transmit a probe response to the electronic device 500 in response thereto. The electronic device 500 may identify the SSID, capability information, a supported data rate, and the like through the probe response transmitted from the access point 400. The electronic device 500 may find an access point 400 capable of providing a best communication quality through the scan process and perform an authentication process with the corresponding access point 400.

According to various embodiments, in the case that the scan is completed, in operation 940, the electronic device 500 may transmit an authentication request to the access point 400 and in operation 950, the access point 400 may transmit an authentication response to the electronic device 500 in response thereto. For example, messages exchanged during the authentication process may include information related to an algorithm used, a number for authentication transaction, information indicating whether authentication is successful, and the like.

According to various embodiments, in the case that the authentication is completed, in operation 960, the electronic device 500 may transmit an association request to the access point 400 and in operation 970, the access point 400 may transmit an association response to the electronic device 400 in response thereto. For example, an association request frame may include information related to capability used for communication between the electronic device 500 and the access point 400, wireless Network Interface Controller (NIC) information, and SSID information. An association response frame may include a rate used for communication, Access Identifier (AID), and the like.

According to various embodiments, the association operation may be completed after the authentication, in operation 990, the electronic device 500 and the access point 400 may determine a key value to be used for communication through 4-way handshake and generate a wireless LAN link.

Figure 10:
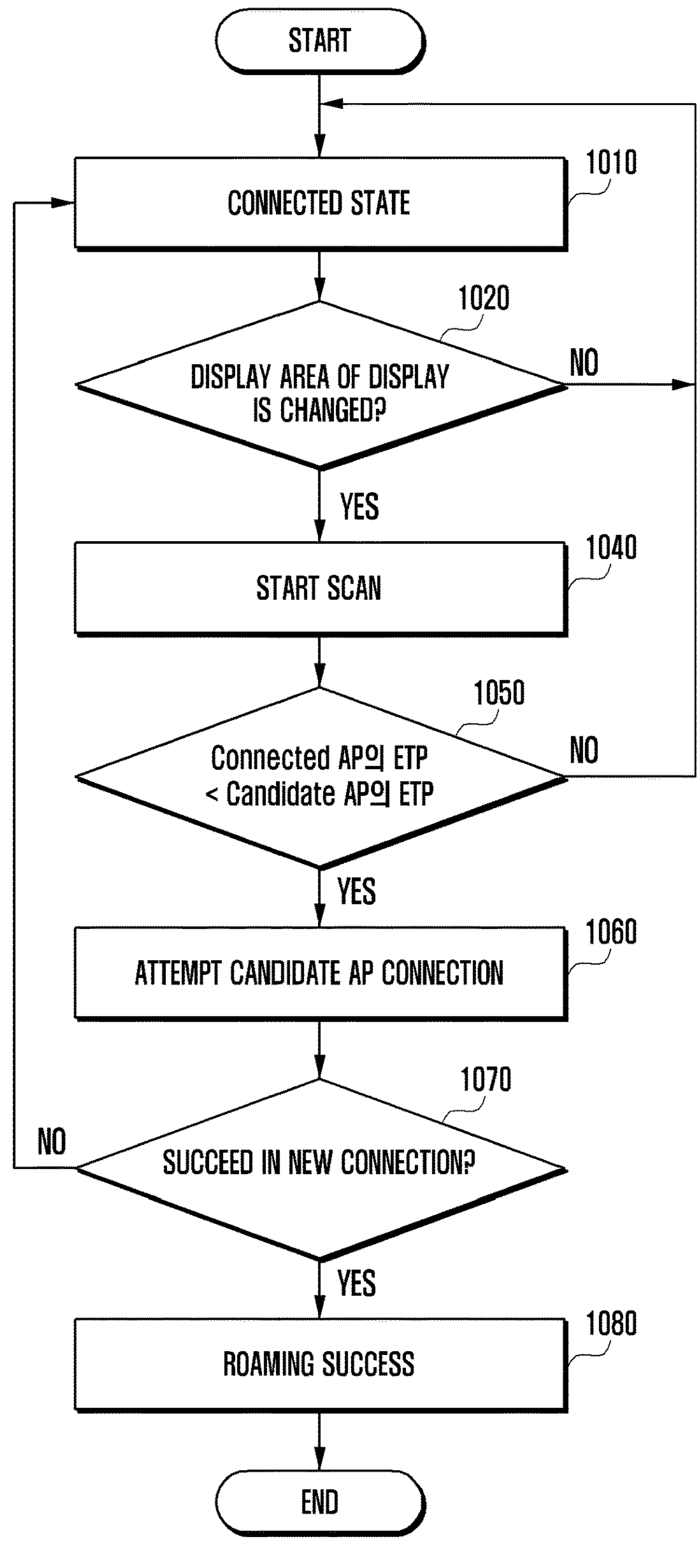
FIG. 10 shows a flowchart of a method in which an electronic device attempts roaming in a weak electric field situation according to various embodiments of the present disclosure.

FIG. 10 shows a flowchart of a method in which an electronic device attempts roaming in a weak electric field situation according to various embodiments.

The method described in the drawing relates to a process of attempting roaming to a second access point (e.g., the second access point 450 in FIG. 4) in the same network in a state in which an electronic device (e.g., the electronic device 500 in FIG. 5) is connected to a first access point (e.g., the first access point 400 in FIG. 4). For example, in the case that the electronic device moves out of coverage of the first access point and into coverage of the second access point, the electronic device may identify the second access point through a scan process and attempt roaming to the second access point.

According to various embodiments, a processor (e.g., the processor 540 in FIG. 5) may be configured to measure a quality of a signal received from a specific access point (e.g., the first access point 400 in FIG. 4) for a predetermined time in a state in which connection to the specific access point is established and attempt roaming to another access point in the case that a signal quality measured for the predetermined time is less than a first reference value, and in the case of detecting a change of a display area of the display in a state in which connection to a specific access point is established, may attempt roaming to another access point (e.g., the second access point 450 in FIG. 4) before a predetermined time has elapsed.

According to various embodiments, in operation 1010, the electronic device may be in a state of being connected to the first access point.

According to various embodiments, in operation 1020, the electronic device may identify whether the display area of the display is changed.

According to various embodiments, the electronic device may identify whether a display area of the display is changed from a second state (e.g., the folded state of a foldable type electronic device or the slide-in state of a rollable type electronic device) to a first state (e.g., the unfolded state of a foldable type electronic device or the slide-out state of a rollable type electronic device). Here, the first state may indicate a state in which the display area of the display is larger than that of the second state and RF performance (or a signal quality) of the antenna module may be better in the first state than in the second state. According to various embodiments, in operation 1020, the electronic device may proceed to operation 1040 in the case that the display area of the display is changed from the first state to the second state or from the second state to the first state.

According to various embodiments, in operation 1040, the electronic device may scan at least one adjacent access point. For example, the electronic device may broadcast a probe request to at least one adjacent access point and the at least one access point having received the probe request may transmit a probe response to the electronic device. Alternatively, the electronic device may identify a beacon signal broadcasted from an access point.

According to various embodiments, in the case that a display area of the display is not changed, the electronic device may maintain connection with the currently connected first access point. According to various embodiments, in the case that a communication quality of the currently connected first access point decreases below a reference value, the electronic device may trigger a scan process for finding an adjacent access point. That is, in the case that a signal strength or congestion of a communication channel reaches a certain threshold due to a weak electric field in a state of being connected to the first access point, or in the case of the BT coexistence state, the electronic device may trigger a scan process for performing roaming to another access point having a better communication quality. A communication quality may be changed when a display area of the display is changed, and thus electronic device may trigger a scan process even if the communication quality with the currently connected first access point does not change. That is, in the case that a display area of the display is changed, the electronic device may trigger a scan process upon detecting the display area (e.g., before a predetermined time elapses) without identifying whether a communication quality decreases below a reference value.

According to various embodiments, in operation 1050, the communication quality (e.g., the ETP, RSSI, and CU) of the currently connected first access point may be compared with a communication quality of a candidate access point identified as a scan result. For example, the electronic device may identify at least one access point through the scan process and add the at least one access point to a candidate access point list, and in this case, an access point having a communication quality better than that of the first access point may be added to the candidate access point list. The electronic device may determine a priority based on a communication quality (e.g., the ETP and RSSI) of a received signal with respect to each access point in the candidate access point list.

According to various embodiments, in operation 1060, the electronic device may attempt connection with a candidate access point (e.g., the second access point). For example, the electronic device may sequentially attempt connection from an access point having a highest priority in the candidate access point list.

According to various embodiments, in operation 1070, the electronic device may identify whether connection with an access point among access points in the candidate access point list is successful. In the case that connection fails, the electronic device may maintain connection with the first access point. In the case that connection is successful, in operation 1080, the electronic device may succeed in roaming to the second access point and transmit or receive data through the second access point.

Figure 11:
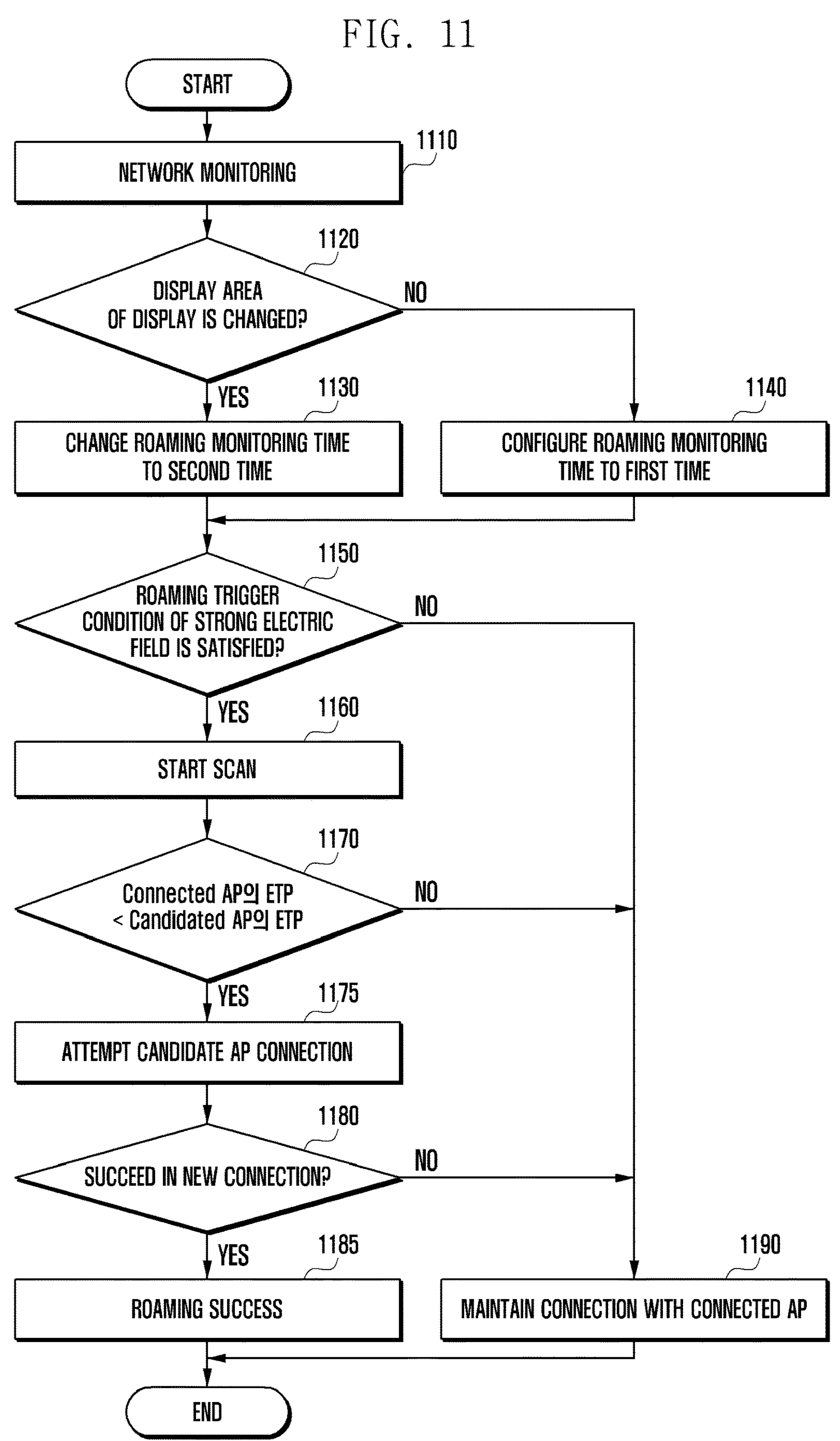
FIG. 11 shows a flowchart of a method in which an electronic device attempts roaming in a strong electric field state according to various embodiments of the present disclosure.

FIG. 11 shows a flowchart of a method in which an electronic device attempts roaming in a strong electric field state according to various embodiments.

According to various embodiments, in the case that a predetermined condition is satisfied in a state in which connection with a specific access point is established, a processor (e.g., the processor 540 in FIG. 5) may attempt roaming to another access point by using a first number of samples acquired during a first time from a signal received from the specific access point.

According to various embodiments, in the case of detecting a change of a display area of the display in a state in which connection with a specific access point is established, the processor may attempt roaming to another access point by using a second number of samples, which is smaller than the first number acquired during a second time shorter than the first time from a signal received from the specific access point.

The roaming operation in a weak electric field situation described in FIG. 10 corresponds to an operation for roaming to another access point in the case that strength of a signal received through an access point is weakened or data communication with a connected access point is difficult, for example, receiving a de-authentication or dis-association frame from the connected access point. Whereas the roaming operation in a strong electric field situation of FIG. 11 corresponds to a process of scanning to attempt roaming in the case that data communication with a currently connected access point is possible but a current network is monitored to find an access point with a better condition and a predetermined condition is satisfied.

According to various embodiments, in operation 1110, the electronic device may monitor an RF state (or network state) with a currently connected access point in a state in which connection with a specific access point is established. The electronic device may monitor an RF state for a predetermined time and this is to increase reliability of data by repeatedly measuring whether the RF state is reliable in a corresponding situation through measurement for a predetermined time.

According to various embodiments, in operation 1120, the electronic device may identify whether a display area of the display is changed from a second state (e.g., the folded state of a foldable type electronic device or the slide-in state of a rollable type electronic device) to a first state (e.g., the unfolded state of a foldable type electronic device or the slide-out state of a rollable type electronic device) or from the first state to the second state. Here, the first state may indicate a state in which the display area of the display is larger than that of the second state and RF performance (or a signal quality) of the antenna module may be better in the first state than in the second state.

According to various embodiments, in the case that the display area of the display is not changed, in operation 1140, the electronic device may configure a roaming monitoring time as a first time. For example, the electronic device may configure the first time as 6 seconds and the number of RSSI samples to acquire as 3, and may acquire each sample in 3 seconds. In this case, sample 1 at 0 seconds, sample 2 at 3 seconds, and sample 3 at 6 seconds may be acquired, and the RF state may be determined using the three samples. Here, the RSSI sample may correspond to an RSSI value of a signal received at a specific time.

According to various embodiments, in the case that the display area of the display is changed, in operation 1130, the electronic device may change a roaming monitoring time to a second time. The second time may be shorter than the first time and the number of samples acquired during the second time may be smaller than the number of samples acquired during the first time. For example, the electronic device may configure the second time as 3 seconds and the number of RSSI samples to acquire as two. In this case, sample 1 at 0 seconds and sample 2 at 3 seconds may be acquired, and the RF state may be determined using the two samples. Alternatively, the electronic device may determine the RF state by using one RSSI sample measured at a time point at which a change of the display area is detected. In the case that the display area of the display is changed from the second state to the first state, the RF performance becomes better and thus accurate measurement may be possible even if the monitoring time and the number of RSSI samples are reduced.

According to various embodiments, in operation 1150, the electronic device may identify whether a trigger condition of a strong electric field is satisfied. The electronic device may use a first number of samples acquired during the first time in the case that the display area of the display is not changed, and may use a second number of samples acquired during the second time in the case that the display area of the display is changed so as to determine whether a trigger condition of a strong electric field is satisfied. For example, the trigger condition of a strong electric field may include whether a minimum RSSI is equal to or greater than a reference value, whether a difference between a maximum RSSI and a minimum RSSI is less than a reference value, and a type of application being executed. The trigger condition of a strong electric field will be described in detail in FIG. 12.

According to various embodiments, in the case that the display area of the display is changed, the electronic device may immediately trigger strong electric field roaming even if a portion (e.g., in the case of a minimum RSSI equal to or greater than a reference value) of the trigger condition of a strong electric field is satisfied.

According to various embodiments, in the case that the trigger condition of a strong electric field is satisfied, in operation 1160, the electronic device may scan an adjacent access point. The electronic device may add an access point identified as a scan result to a candidate access point list.

According to various embodiments, in operation 1170, the electronic device may compare a communication quality (e.g., the CU) of a currently connected access point with a communication quality of a candidate access point identified as a scan result.

According to various embodiments, in the case that a communication quality of a candidate access point is better than that of a currently connected access point, in operation 1175, the electronic device may attempt connection with a corresponding access point.

According to various embodiments, the electronic device may identify whether connection with the candidate access point is successful in operation 1180 and succeed in roaming with the candidate access point and transmit or receive data through the corresponding access point in operation 1185. The electronic device may sequentially attempt connection with access points included in candidate access points according to a priority order and in the case that connection to all access points fails, determine connection failure and maintain connection with a currently connected access point in operation 1190.

Figure 12:
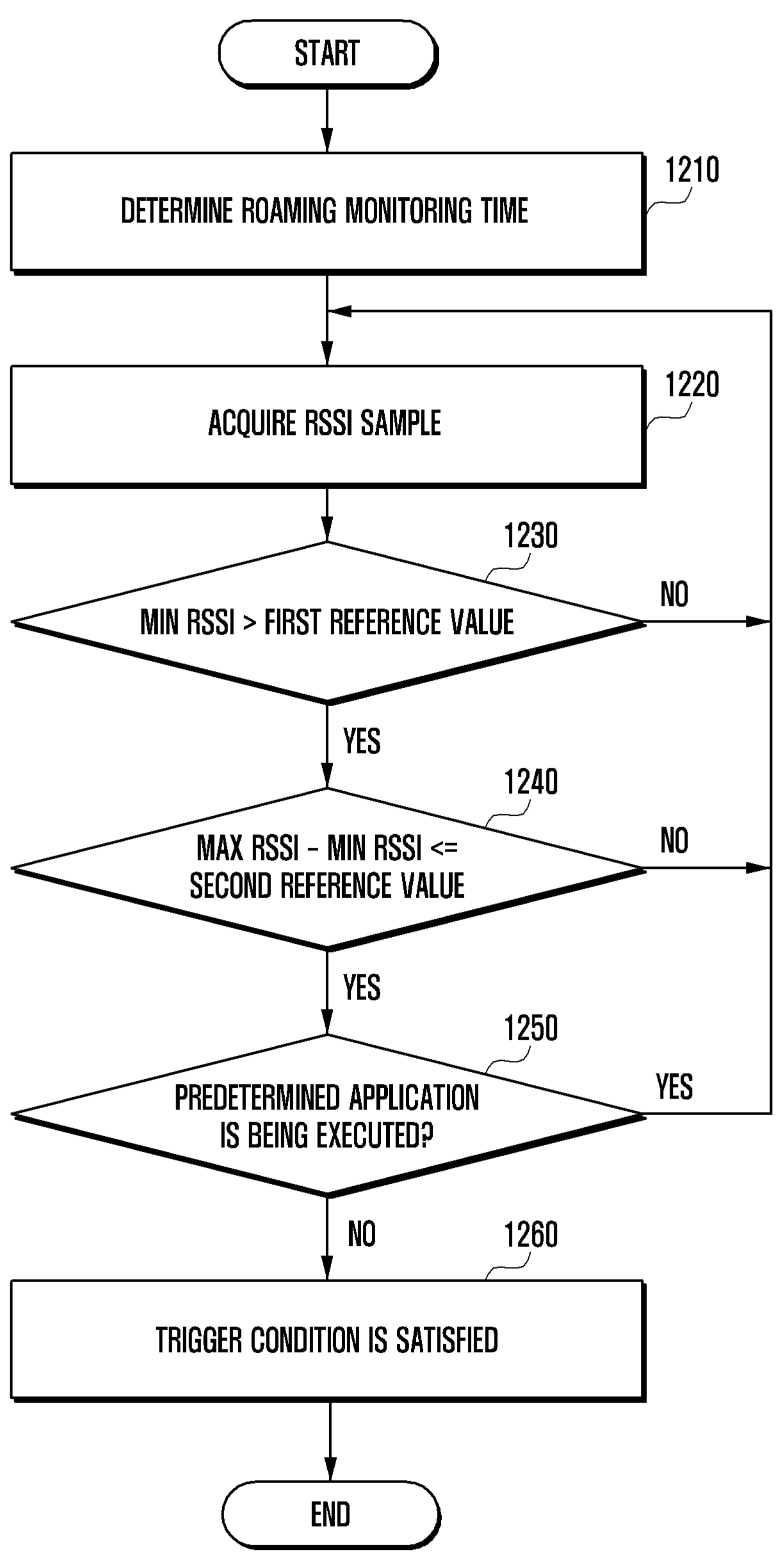
FIG. 12 shows a flowchart of a method in which an electronic device identifies whether a trigger condition of strong electric field roaming is satisfied according to various embodiments of the present disclosure.

FIG. 12 shows a flowchart of a method in which an electronic device identifies whether a trigger condition of strong electric field roaming is satisfied according to various embodiments of the present disclosure.

The method described in the drawing may relate to an operation of identifying whether a trigger condition of a strong electric field is satisfied (operation 1150) in FIG. 11.

According to various embodiments, in operation 1210, an electronic device (e.g., the electronic device 500 in FIG. 5) may determine a roaming monitoring time. For example, the electronic device may determine a monitoring time to be a first time (e.g., six seconds) and change a monitoring time to a second time (e.g., three seconds) in the case of detecting a change of a display area of a display (e.g., the display 510 in FIG. 5).

According to various embodiments, in operation 1220, the electronic device may acquire at least one RSSI sample. For example, a first number (e.g., three) of RSSI samples may be acquired in the case that the monitoring time is configured to be the first time (e.g., 6 seconds) and a second number (e.g., two) of RSSI samples may be acquired in the case that the monitoring time is configured to be the second time (e.g., 3 seconds).

According to various embodiments, in operation 1230, the electronic device may identify whether a minimum RSSI value of an acquired sample is equal to or greater than a first reference value. The minimum RSSI value may be considered as a lowest communication quality during the monitoring time and it may be determined that a communication environment has a strong electric field situation in the case that the minimum RSSI value is equal to or greater than the first reference value.

According to various embodiments, in operation 1240, the electronic device may identify whether a difference between a minimum RSSI and a maximum RSSI of an acquired sample is less than a second reference value. Through the difference between the maximum RSSI and the minimum RSSI, a degree of a change during the monitoring time may be identified and it may be determined that a communication environment is stable in the case that the difference between the maximum RSSI and the minimum RSSI is less than the second reference value.

According to various embodiments, in operation 1250, the electronic device may identify whether a predetermined application (e.g., a real-time streaming application) is executed. For example, in the case that uninterrupted data reception is important, such as in real-time streaming applications, roaming to another access point may cause a temporary interruption in data reception and thus the electronic device may not attempt a strong electric field roaming.

According to various embodiments, in the case that all conditions of operation 1230, operation 1240, and operation 1250 are satisfied, the electronic device may determine that a trigger condition of a strong electric field is satisfied and start to scan an adjacent access point in operation 1260. In the case that at least one condition of operation 1230, operation 1240, and operation 1250 is not satisfied, the electronic device may maintain connection with a currently connected access point, acquire an RSSI sample again after a predetermined period elapses, and re-perform an operation of identifying whether a trigger condition is satisfied.

According to various embodiments, in the case that the display area of the display is changed and a portion of a trigger condition of a strong electric field, for example, a minimum RSSI satisfies a reference value or more (operation 1230), the electronic device may omit processes (operation 1240 and operation 1250) for identifying other conditions and immediately trigger strong electric field roaming.

Figure 13:
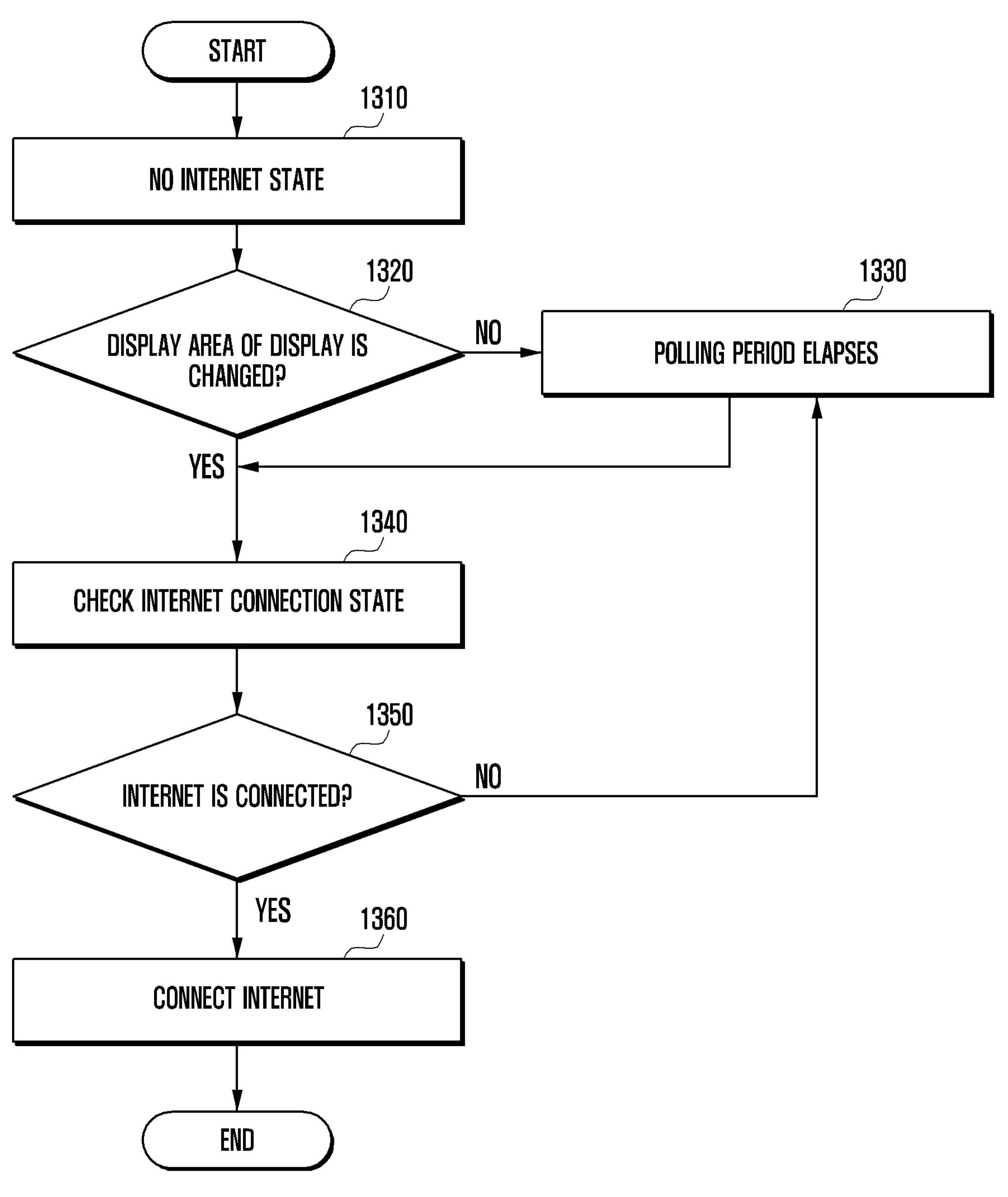
FIG. 13 shows a flowchart of a method in which an electronic device attempts to connect to the Internet in a state in which the Internet is not available according to various embodiments of the present disclosure.

FIG. 13 shows a flowchart of a method in which an electronic device attempts to connect to the Internet in a state in which the Internet is not available according to various embodiments of the present disclosure.

According to various embodiments, a processor (e.g., the processor 540 in FIG. 5) may be configured to transmit an Internet connection request according to a predetermined polling period in the case that there is no Internet connection in a state in which connection to a specific access point is established and transmit an Internet connection request before the polling period has elapsed in the case of detecting a change of a display area of a display.

According to various embodiments, in operation 1310, an electronic device (e.g., the electronic device 500 in FIG. 5) may be in a state in which a connection with an access point is established but not connected to the Internet. For example, there may be a case in which wireless LAN connection between the electronic device and an adjacent access point is established to form a communication link but the electronic device does not access the Internet due to a temporary error in a network connected to the access point, or the like.

According to various embodiments, when not connected to the Internet, the electronic device may attempt to connect to the Internet according to a predetermined polling period. For example, the electronic device may attempt to connect to the Internet by gradually increasing a polling period, such as 1, 2, 4, and 8 seconds. Here, the Internet connection attempt may indicate transmitting a HTTP/HTTPS request or DNS request to a network connected through an access point.

According to various embodiments, in operation 1320, the electronic device may identify whether a display area of the display is changed from a second state (e.g., the folded state of a foldable type electronic device or the slide-in state of a rollable type electronic device) to a first state (e.g., the unfolded state of a foldable type electronic device or the slide-out state of a rollable type electronic device). Here, the first state may indicate a state in which the display area of the display is larger than that of the second state and RF performance (or a signal quality) of the antenna module may be better in the first state than in the second state. According to various embodiments, in operation 1320, the electronic device may proceed to operation 1340 in the case that the display area of the display is changed from the first state to the second state or from the second state to the first state.

According to various embodiments, in the case that the display area of the display is not changed and maintained, after a polling period elapses in operation 1330, the electronic device may check an Internet connection state in operation 1340.

According to various embodiments, in the case that the display area of the display is changed, in operation 1340, the electronic device may check an Internet connection state and attempt to connect to the Internet. In operation 1350, the electronic device may identify whether the Internet is connected and in the case that the Internet is not connected, wait until a next polling period elapses and check an Internet connection state. For example, in the case of entering a no Internet state for the first time, the electronic device may transmit a HTTPS request after 1 second according to a polling period. In the case that there is no response despite the HTTPS request, the electronic device may transmit a HTTPS request again after 2 seconds corresponding to a next polling period, and in the case that there is still no response, transmit a HTTPS request again after 4 seconds corresponding to a next polling period. In the case that there is no response again and a user changes the display area of the display after 3 seconds before a next polling period of 8 seconds has elapsed (e.g., unfolding equal to or more than a reference angle of a foldable display or extending equal to or more than a reference length of a rollable display), the electronic device may not wait for a polling period and immediately transmit a HTTPS request. In the case that there is no response again, the electronic device may transmit a HTTPS request after 5 seconds elapses, which is a time to a next polling period. In the case that the display area of the display of the electronic device is changed from the first state to the second state, an RF signal state becomes better and thus electronic device may immediately identify whether the Internet is available as described above.

According to various embodiments, in operation 1360, in the case that a HTTPS response or a DNS response is normally received, the electronic device may determine a state as an Internet connection state and receive data from a network through an access point.

FIG. 14 illustrates an MLO link of an electronic device according to various embodiments.

In the IEEE 802.11 standard, a technique for supporting a multi-link operation (MLO) is introduced to improve data transmission and reception speed and reduce delay time. The MLO may indicate a method for concurrently transmitting and receiving data by forming multiple links between two devices connected through wireless LAN communication. The electronic device and an access point may form multiple links belonging to the unlicensed frequency bands of 2.4 GHz, 5 GHz, and 6 GHz through the MLO.

Referring to FIG. 14, the electronic device 500 may form link 1, link 2, and link 3 with the access point 400. Link 1 may use a channel in a 2.4 GHz band, link 2 may use a channel in a 5 GHz band, and link 3 may use a channel in a 6 GHz band. Each link may have a different address in an MAC layer.

The electronic device 500 may include multiple cores for arithmetic processing and each core may manage each link. For example, in the case that the electronic device 500 includes two cores, the electronic device 500 may form up to two MLO links among channels in the 2.4 GHz, 5 GHz, and 6 GHz bands.

Figure 15:
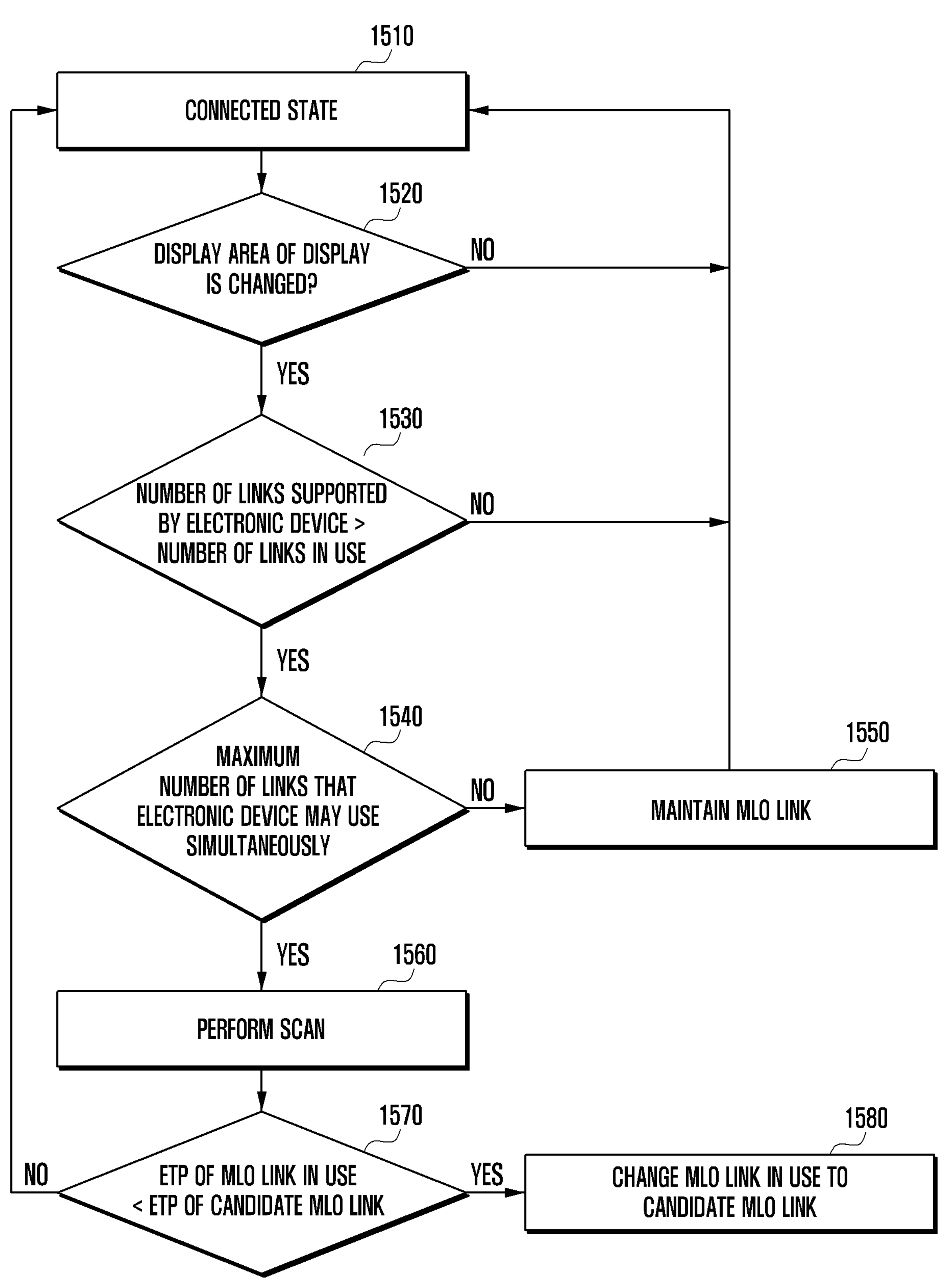
FIG. 15 shows a flowchart of a method in which an electronic device changes an MLO link according to various embodiments of the present disclosure.

FIG. 15 shows a flowchart of a method in which an electronic device changes an MLO link according to various embodiments.

According to various embodiments, in the case of detecting a change of a display area of a display in a state of being connected to an access point by using multiple MLO links, a processor (e.g., the processor 540 in FIG. 5) may be configured to add an MLO link or change at least one of the multiple MLO links in use to a link in another frequency band.

According to various embodiments, in operation 1510, an electronic device (e.g., the electronic device 500 in FIG. 5) may be connected to an access point by forming an MLO link therebetween.

According to various embodiments, in operation 1520, the electronic device may identify whether a display area of the display is changed from a second state (e.g., the folded state of a foldable type electronic device or the slide-in state of a rollable type electronic device) to a first state (e.g., the unfolded state of a foldable type electronic device or the slide-out state of a rollable type electronic device). Here, the first state may indicate a state in which the display area of the display is larger than that of the second state and RF performance (or a signal quality) of the antenna module may be better in the first state than in the second state. According to various embodiments, in operation 1520, the electronic device may proceed to operation 1530 in the case that the display area of the display is changed from the first state to the second state or from the second state to the first state.

According to various embodiments, in operation 1530, the electronic device may identify whether the number of links supported by the electronic device is larger than the number of links currently used. There are three unlicensed frequency bands, that is, 2.4 GHz, 5 GHz, and 6 GHz available for MLO, but a communication module and an antenna of the electronic device may support only some of the unlicensed frequency bands. For example, in the case that the electronic device supports 2.4 GHz and 5 GHz, the number of links supportable by the electronic device may be two. If the number of links supportable by the electronic device is three and all three links are currently used, operations such as changing or adding links may not be possible. In the case that the number of links supportable by the electronic device is less than the number of links currently used, in operation 1550, the electronic device may maintain an MLO link currently used.

According to various embodiments, in operation 1540, the electronic device may identify whether the maximum number of links that the electronic device may use simultaneously and the number of links currently used are the same. Here, the maximum number of links that the electronic device may use simultaneously may be determined by the number of cores. For example, up to two links may be used simultaneously in the case of two cores and up to three links may be used simultaneously in the case of three cores. Since it is impossible that the number of links currently used is greater than the number of cores of the electronic device, in the case that the number of links currently used and the number of cores are not the same, there is an extra core to add a link and thus the electronic device may perform an operation for adding an MLO link. In the case that the maximum number of links that the electronic device may use simultaneously is not equal to the number of links currently used, in operation 1550, the electronic device may maintain an MLO link currently used.

According to various embodiments, in operation 1560, the electronic device may perform scan to add an MLO link. Here, the scan may be performed on a different frequency band other than a frequency band of the MLO link currently used.

According to various embodiments, in operation 1570, the electronic device may compare a communication quality (e.g., an ETP) of an MLO link currently used with a communication quality of an MLO link identified through a scan.

According to various embodiments, in the case that a communication quality of an MLO link identified through a scan is better, in operation 1580, the electronic device may change at least one MLO link among MLO links currently used to a candidate MLO link and establish connection with an access point by using the candidate MLO link identified through a scan.

Figure 16:
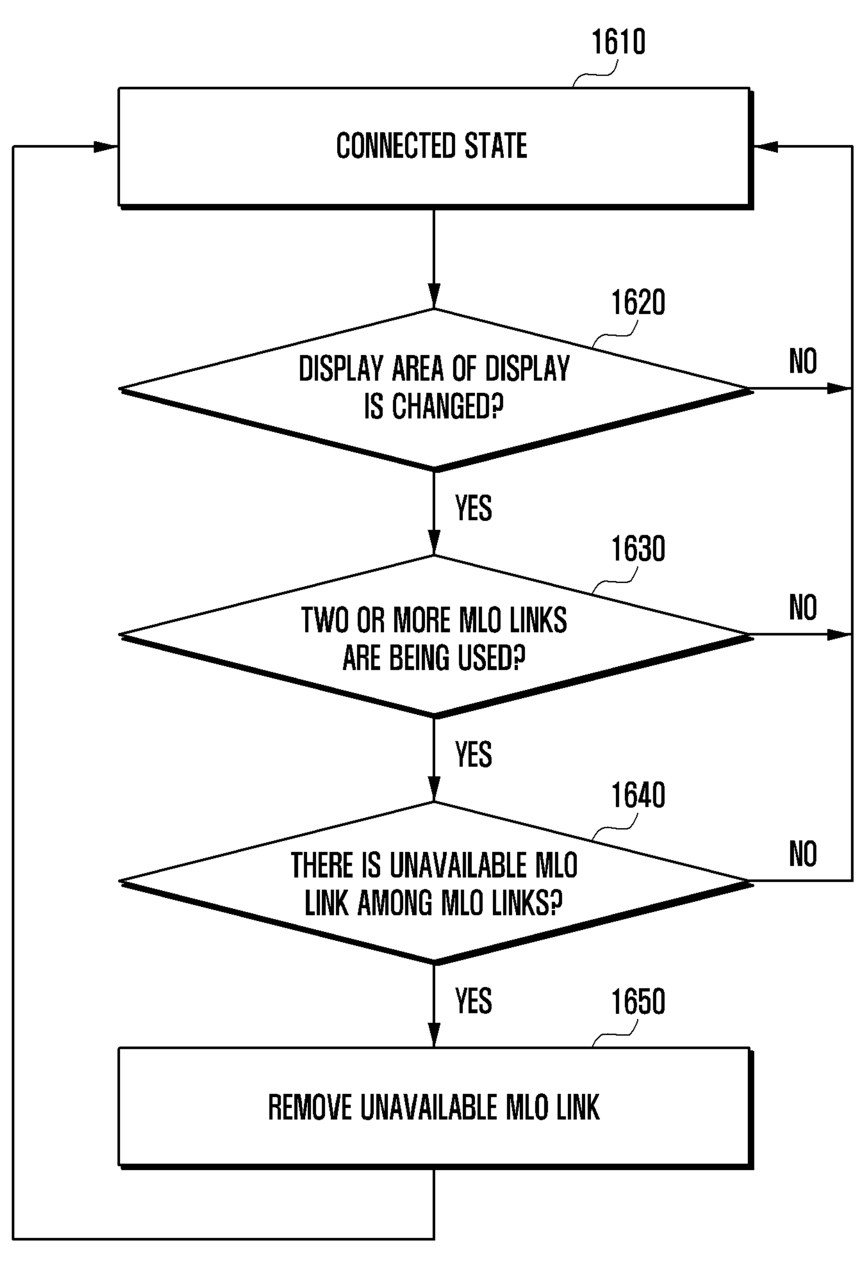
FIG. 16 shows a flowchart of a method in which an electronic device removes an MLO link according to various embodiments of the present disclosure.

FIG. 16 shows a flowchart of a method in which an electronic device removes an MLO link according to various embodiments.

According to various embodiments, in the case of identifying an unavailable MLO link according to a change of a display area of a display, a processor (e.g., the processor 540 in FIG. 5) may be configured to release connection using the identified MLO link.

According to various embodiments, in operation 1610, an electronic device (e.g., the electronic device 500 in FIG. 5) may be connected to an access point by forming an MLO link therebetween.

According to various embodiments, in operation 1620, the electronic device may identify whether a display area of the display is changed from a first state (e.g., the unfolded state of a foldable type electronic device or the slide-out state of a rollable type electronic device) to a second state (e.g., the folded state of a foldable type electronic device or the slide-in state of a rollable type electronic device). Here, the second state may indicate a state in which the display area of the display is smaller than that of the first state and RF performance (or a signal quality) of the antenna module may be lower when changed from the first state to the second state.

According to various embodiments, in operation 1630, the electronic device may identify whether there are two or more MLO links currently used.

According to various embodiment, in the case that there are two MLO links currently used, in operation 1640, the electronic device may identify whether there is an unavailable MLO link among MLO links currently used. According to various embodiments, the electronic device may determine an MLO link as an unavailable MLO link in the case that a strength (or an RSSI) of a reception signal through an MLO link is less than a reference value, a received Rx packet is maintained less than a reference value (e.g., 15 packets) for a predetermined time (e.g., 3 seconds), a DNS response is refused, there is no reception packet (SYN/ACK) for SYN during TCP connection, or there is no response for a DNS query. The electronic device may identify whether at least one of MLO links is unavailable by using at least one of the above-described conditions and one or more test methods for checking an Internet connection state may be used in addition thereto.

According to various embodiments, in the case that there is an unavailable MLO link among MLO links currently used, in operation 1650, the electronic device may remove the unavailable MLO link. As such, the removal of the unavailable MLO link not conductive to actual communication may give effects of reducing resources of a processor and/or a communication module and improving current consumption.

An electronic device according to various embodiments of the disclosure may include a display of which at least a portion is flexible and a display area exposed to the outside may be changed, an antenna module, a communication module for performing wireless LAN communication with an access point by using the antenna module, and a processor.

According to various embodiments, the processor may be configured to detect a change of the display area of the display and, in the case that the change of the display area of the display is detected, scan at least one adjacent access point by using the communication module and the antenna module.

According to various embodiments, in the case of detecting a change of the display area of the display in a state in which connection with an access point is not established, the processor may be configured to scan at least one adjacent access point by using the communication module and the antenna module.

According to various embodiments, the processor may be configured to measure a quality of a signal received from at least one adjacent access point in a scan process, add at least one access point of which the measured quality of the signal is higher than a reference value to a connection candidate list, and attempt connection establishment from an access point having a highest signal quality among at least one access point included in the connection candidate list.

According to various embodiments, the signal quality may include at least one of an estimated throughput (ETP) or a received signal strength indicator (RSSI).

According to various embodiments, the processor may be configured to measure a quality of a signal received from a specific access point for a predetermined time in a state in which connection to the specific access point is established and attempt roaming to another access point in the case that the signal quality measured for the predetermined time is less than a first reference value, and in the case of detecting a change of a display area of the display in a state in which connection to the specific access point is established, may attempt roaming to another access point before a predetermined time has elapsed.

According to various embodiments, in the case that a predetermined condition is satisfied in a state in which connection with a specific access point is established, the processor may be configured to attempt roaming to another access point by using a first number of samples acquired during a first time from a signal received from the specific access point, and in the case of detecting a change of a display area of the display in a state in which connection with the specific access point is established, attempt roaming to another access point by using a second number of samples, which is smaller than the first number, acquired during a second time shorter than the first time from a signal received from the specific access point.

According to various embodiments, the electronic device may communicate with an access point by using at least one channel belonging to at least one of a first frequency band or a second frequency band higher than the first frequency band and in the case of detecting a change of a display area of the display in a state in which connection with the specific access point is established through a first channel of the first frequency band, the processor may be configured to attempt roaming to another access point supporting a second channel of the second frequency band.

According to various embodiments, the processor may be configured to transmit an Internet connection request according to a predetermined polling period in the case that there is no Internet connection in a state in which connection to a specific access point is established and transmit the Internet connection request before the polling period has elapsed in the case of detecting a change of the display area of the display.

According to various embodiments, the electronic device may support a multi-link operation (MLO) for performing wireless LAN communication with an access point device through multiple links and in the case of detecting a change of a display area of the display in a state of being connected to an access point by using multiple MLO links, the processor may be configured to add an MLO link or change at least one of the multiple MLO links in use to a link in another frequency band.

According to various embodiments, in the case of identifying an available MLO link according to a change of a display area of the display, the processor may be configured to release connection using the identified MLO link.

According to various embodiments, the electronic device may further include a first housing and a second housing connected to the first housing through a hinge structure, and the display may include a first area disposed in the first housing and a second area disposed in the second housing and may be folded based on a boundary area between the first area and the second area.

According to various embodiments, the processor may be configured to determine the display area to be in a first state in the case that an angle between the first area and the second area becomes equal to or greater than a reference angle and determine the display area to be in a second state in the case that an angle between the first area and the second area becomes smaller than the reference angle.

According to various embodiments, the electronic device may further include a first housing and a second housing coupled to slide with respect to the first housing, and the display area of the display may be contracted or extended based on slide-in or slide-out of the second housing.

According to various embodiments, the processor may be configured to determine the display area to be in a first state in the case that the display is extended to be equal to or greater than a reference length and determine the display area to be in a second state in the case that the display area is contracted to be less than the reference length.

According to various embodiments, in the case that the display area of the display is changed from the first state to the second state, strength of a signal transmitted or received through the antenna module may be reduced.

With respect to a method for improving a communication quality of an electronic device according to various embodiments of the disclosure, the electronic device may include a display of which at least a portion is flexible and a display area exposed to the outside may be changed and the method may include an operation of detecting a change of the display area of the display and an operation of scanning at least one adjacent access point by using the communication module and the antenna module in the case that a change of the display area of the display is detected.

According to various embodiments, the operation of scanning at least one access point may include an operation of scanning at least one adjacent access point in the case of detecting a change of the display area of the display in a state in which connection with an access point is not established.

According to various embodiments, the method may further include an operation of measuring a quality of a signal received from a specific access point for a predetermined time in a state in which connection to the specific access point is established and attempting roaming to another access point in the case that the signal quality measured for the predetermined time is less than a first reference value, and an operation of attempting roaming to another access point before a predetermined time has elapsed in the case of detecting a change of a display area of the display in a state in which connection to the specific access point is established.

According to various embodiments, the method may further include an operation of attempting roaming to another access point by using a first number of samples acquired during a first time from a signal received from a specific access point in the case that a predetermined condition is satisfied in a state in which connection with the specific access point is established, and an operation of attempting roaming to another access point by using a second number of samples, which is smaller than the first number, acquired during a second time shorter than the first time from a signal received from the specific access point in the case of detecting a change of the display area of the display in a state in which connection with the specific access point is established.

According to various embodiments, the method may include an operation of transmitting an Internet connection request according to a predetermined polling period in the case that there is no Internet connection in a state in which connection to a specific access point is established and an operation of transmitting the Internet connection request before the polling period has elapsed in the case of detecting a change of the display area of the display.

According to various embodiments, the electronic device may support a multi-link operation (MLO) for performing wireless LAN communication with an access point device through multiple links.

According to various embodiments, the method may include an operation of adding an MLO link or changing at least one of the multiple MLO links in use to a link in another frequency band in the case of detecting a change of the display area of the display in a state of being connected to an access point by using multiple MLO links.

According to various embodiments, the electronic device may further include a first housing and a second housing connected to the first housing through a hinge structure, and the display may include a first area disposed in the first housing and a second area disposed in the second housing and may be folded based on a boundary area between the first area and the second area.

According to various embodiments, the operation of detecting a change in the display area may include an operation of determining the display area to be in a first state in the case that an angle between the first area and the second area becomes equal to or greater than a reference angle and an operation of determining the display area to be in a second state in the case that an angle between the first area and the second area becomes smaller than the reference angle.

The embodiments of the disclosure disclosed in the specification and the drawings are only particular examples proposed in order to more clearly describe the technical contents according to the embodiments of the disclosure and help with comprehension of the embodiments of the disclosure, and do not limit the scope of the embodiments of the disclosure. Therefore, the scope of various embodiments of the disclosure should be interpreted to include all changes or modified forms derived based on the technical spirit of various embodiments of the disclosure in addition to the embodiments disclosed herein.

The invention claimed is:

1. An electronic device comprising:

a first housing;

a second housing;

a display comprising at least a portion that is flexible and a display area exposed to an outside that is changeable;

an antenna;

a communication circuit configured to perform wireless local area network (LAN) communication with an access point by using the antenna;

memory, comprising one or more storage media, storing instructions; and one or more processors communicatively coupled to the display, the antenna, the communication circuit, and the memory, wherein the instructions, when executed by the one or more processors individually or collectively, cause the electronic device to:

detect a change of the display area of the display corresponding to a change in position of the second housing relative to the first housing; and based on the detecting of the change of the display area, scan at least one adjacent access point by using the communication circuit and the antenna.

2. The electronic device of claim 1, wherein the instructions, when executed by the one or more processors individually or collectively, further cause the electronic device to:

scan at least one adjacent access point by using the communication circuit and the antenna in a case that the change of the display area of the display is detected in a state in which connection with an access point is not established.

3. The electronic device of claim 2, wherein the instructions, when executed by the one or more processors individually or collectively, further cause the electronic device to:

measure a quality of a signal received from the at least one adjacent access point in a process of the scanning;

add at least one access point of which the measured quality of the signal is higher than a reference value to a connection candidate list; and attempt connection establishment from an access point having a highest signal quality among at least one access point included in the connection candidate list.

4. The electronic device of claim 3, wherein the quality of the signal comprises at least one of an estimated throughput (ETP), a received signal strength indicator (RSSI), or channel utilization (CU).

5. The electronic device of claim 1, wherein the instructions, when executed by the one or more processors individually or collectively, further cause the electronic device to:

measure a quality of a signal received from a specific access point for a predetermined time in a state in which connection to the specific access point is established and attempt roaming to another access point in a case that the measured quality of the signal measured for the predetermined time is less than a first reference value; and attempt roaming to another access point before a predetermined time has elapsed in a case that the change of the display area of the display is detected in a state in which connection to the specific access point is established.

6. The electronic device of claim 1, wherein the instructions, when executed by the one or more processors individually or collectively, further cause the electronic device to:

attempt roaming to another access point by using a first number of samples acquired during a first time from a signal received from a specific access point in a case that a predetermined condition is satisfied in a state in which connection with the specific access point is established; and attempt roaming to another access point by using a second number, which is smaller than the first number, of samples acquired during a second time shorter than the first time from the signal received from the specific access point in a case that the change of the display area of the display is detected in a state in which connection with the specific access point is established.

7. The electronic device of claim 6, wherein the electronic device is capable of communicating with an access point by using at least one channel belonging to at least one of a first frequency band or a second frequency band higher than the first frequency band, and wherein the instructions, when executed by the one or more processors individually or collectively, further cause the electronic device to:

attempt roaming to another access point supporting a second channel of the second frequency band in a case that the change of the display area of the display is detected in a state in which connection with the specific access point is established through a first channel of the first frequency band.

8. The electronic device of claim 1, wherein the instructions, when executed by the one or more processors individually or collectively, further cause the electronic device to:

transmit an Internet connection request according to a predetermined polling period in a case that there is no Internet connection in a state in which connection to a specific access point is established; and transmit the Internet connection request before a polling period has elapsed in a case that the change of the display area of the display is detected.

9. The electronic device of claim 1, wherein the electronic device supports a multi-link operation (MLO) configured to perform wireless LAN communication with an access point device through multiple MLO links, and wherein the instructions, when executed by the one or more processors individually or collectively, further cause the electronic device to:

add an MLO link or change at least one of the multiple MLO links in use to a link in another frequency band in a case that the change of the display area of the display is detected in a state of being connected to an access point by using multiple MLO links.

10. The electronic device of claim 9, wherein the instructions, when executed by the one or more processors individually or collectively, further cause the electronic device to:

in a case of identifying an available MLO link according to the change of the display area of the display, release connection using the identified MLO link.

11. The electronic device of claim 1, wherein the display comprises a first area disposed in the first housing and a second area disposed in the second housing and is foldable based on a boundary area between the first area and the second area, and wherein the instructions, when executed by the one or more processors individually or collectively, further cause the electronic device to:

determine the display area to be in a first state in a case that an angle between the first area and the second area becomes equal to or greater than a reference angle; and determine the display area to be in a second state in a case that the angle between the first area and the second area becomes smaller than the reference angle.

12. The electronic device of claim 1, further comprising:

wherein the display area of the display is contracted or extended based on slide-in or slide-out of the second housing, and wherein the instructions, when executed by the one or more processors individually or collectively, further cause the electronic device to:

determine the display area to be in a first state in a case that the display is extended to be equal to or greater than a reference length; and determine the display area to be in a second state in a case that the display area is contracted to be less than the reference length.

13. The electronic device of claim 1, wherein the antenna includes a first antenna and a second antenna, wherein the first antenna is disposed in the first housing and the second antenna is disposed in the second housing, and wherein a distance between the first antenna and the second antenna changes based on the change of the display area.

14. A method performed by an electronic device for improving a communication quality in which the electronic device includes a first housing, a second housing, a communication circuit, an antenna, and a display of which at least a portion is flexible and a display area exposed to an outside is changeable, the method comprising:

detecting, by the electronic device, a change of the display area of the display corresponding to a change in position of the second housing relative to the first housing; and based on the detecting of the change of the display area, scanning, by the electronic device, at least one adjacent access point by using the communication circuit and the antenna.

15. The method of claim 14, wherein the scanning of the at least one adjacent access point comprises scanning the at least one adjacent access point in a case that the change of the display area of the display is detected in a state in which connection with an access point is not established.

16. The method of claim 14, further comprising:

measuring, by the electronic device, a quality of a signal received from a specific access point for a predetermined time in a state in which connection to the specific access point is established and attempting roaming to another access point in a case that the measured quality of the signal for the predetermined time is less than a first reference value; and attempting, by the electronic device, roaming to another access point before a predetermined time has elapsed in a case that the change of the display area of the display is detected in a state in which connection to the specific access point is established.

17. The method of claim 14, further comprising:

attempting, by the electronic device, roaming to another access point by using a first number of samples acquired during a first time from a signal received from a specific access point in a case that a predetermined condition is satisfied in a state in which connection with the specific access point is established; and attempting, by the electronic device, roaming to another access point by using a second number, which is smaller than the first number, of samples acquired during a second time shorter than the first time from the signal received from the specific access point in a case of detecting the change of the display area of the display in a state in which connection with the specific access point is established.

18. The method of claim 14, further comprising:

transmitting, by the electronic device, an Internet connection request according to a predetermined polling period in a case that there is no Internet connection in a state in which connection to a specific access point is established; and transmitting, by the electronic device, the Internet connection request before a polling period has elapsed in a case that the change of the display area of the display is detected.

19. The method of claim 14, wherein the electronic device supports a multi-link operation (MLO) configured to perform wireless LAN communication with an access point device through multiple MLO links, and wherein the method further comprises:

adding, by the electronic device, an MLO link or changing at least one of the multiple MLO links in use to a link in another frequency band in a case that the change of the display area of the display is detected in a state of being connected to an access point by using multiple MLO links.

20. The method of claim 14, wherein the display comprises:

a first area disposed in the first housing; and a second area disposed in the second housing and is folded based on a boundary area between the first area and the second area, and wherein the detecting of the change of the display area of the display comprises:

determining, by the electronic device, the display area to be in a first state in a case that an angle between the first area and the second area becomes equal to or greater than a reference angle; and determining, by the electronic device, the display area to be in a second state in a case that the angle between the first area and the second area becomes smaller than the reference angle.

* * * * *